(12) United States Patent
Hayashi

(10) Patent No.: US 6,501,561 B2
(45) Date of Patent: *Dec. 31, 2002

(54) OVERLAY PRINTING

(75) Inventor: Eiji Hayashi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,930

(22) Filed: Feb. 26, 1999

(65) Prior Publication Data

US 2002/0114007 A1 Aug. 22, 2002

(30) Foreign Application Priority Data

Feb. 27, 1998 (JP) ............................ 10-047452
Feb. 16, 1999 (JP) ............................ 11-037189

(51) Int. Cl.⁷ ........................... G06F 15/00; G06K 1/00; B41B 15/00
(52) U.S. Cl. ..................... 358/1.18; 358/1.1; 358/1.2; 358/1.16; 358/1.13
(58) Field of Search ................... 358/1.9, 1.15, 358/1.18, 1.2, 1.1, 426, 261.2, 1.13, 1.16

(56) References Cited

U.S. PATENT DOCUMENTS 5,859,954 A * 1/1999 Toda ........................ 358/1.2
5,878,198 A * 3/1999 Yuasa et al. ............... 358/1.18
6,304,336 B1 * 10/2001 Sugaya ..................... 358/1.16

FOREIGN PATENT DOCUMENTS

JP          10-285421         10/1998

* cited by examiner

Primary Examiner—Mark Wallerson
Assistant Examiner—Twyler Lamb
(74) Attorney, Agent, or Firm—Fitzpatrick, Cella, Harper & Scinto

(57) ABSTRACT

To raise a form overlay print processing efficiency of an output job which is inputted and a form raster image which is generated from form data and to remarkably improve a throughput, when the form data that is derived from a host computer is registered into an RAM 19 or the like, the form data which is overlappingly used by a CPU 12 is discriminated, and overlapped processes such as registration of the font data, generation of the form raster image-based on the form data, deletion of the form data, and the like are skipped.

60 Claims, 15 Drawing Sheets

FIG. 14

MEMORY MAP OF FD / CD-ROM

| DIRECTORY |
|---|
| FIRST DATA PROCESSING PROGRAM PROGRAM CODES FOR STEPS OF FLOWCHART OF FIG. 5 |
| SECOND DATA PROCESSING PROGRAM PROGRAM CODES FOR STEPS OF FLOWCHART OF FIG. 6 |
| THIRD DATA PROCESSING PROGRAM PROGRAM CODES FOR STEPS OF FLOWCHART OF FIG. 7 |
| FOURTH DATA PROCESSING PROGRAM PROGRAM CODES FOR STEPS OF FLOWCHART OF FIG. 8 |
| FIFTH DATA PROCESSING PROGRAM PROGRAM CODES FOR STEPS OF FLOWCHART OF FIG. 9 |
| SIXTH DATA PROCESSING PROGRAM PROGRAM CODES FOR STEPS OF FLOWCHART OF FIG. 10 |
| SEVENTH DATA PROCESSING PROGRAM PROGRAM CODES FOR STEPS OF FLOWCHART OF FIG. 11 |
| EIGHTH DATA PROCESSING PROGRAM PROGRAM CODES FOR STEPS OF FLOWCHART OF FIG. 12 |
| NINTH DATA PROCESSING PROGRAM PROGRAM CODES FOR STEPS OF FLOWCHART OF FIG. 13 |
|  |

OVERLAY PRINTING

BACKGROUND OF THE INVENTION

1. Field of the Invention

The invention relates to a print control apparatus for performing a printing process by overlaying predetermined form data and print information which is inputted, a form data processing method of the print control apparatus, and a storage medium in which a computer readable program has been stored.

2. Related Background Art

Hitherto, in case of printing by overlaying certain data (hereinafter, referred to as form data) to a job of a plurality of pages (hereinafter, such a print is called an overlay print), a printer driver in a host computer for controlling a function to overlay and print by a printer has been proposed.

The form overlay function using the form data is a function for registering form data comprising a macro as a number into the printer (macro registration) and designating the registration number by a page using the registered form data (macro execution).

Hitherto, there are two specifications as such a form overlay function using the macro data.

First, in the first specification, in one job, a plurality of macros are first registered in a lump, a designation of the registration number as a macro execution and a raster development of the macro are subsequently performed on a page unit basis, and a deletion of the form data (deletion of the macros) is executed at the end of a job.

In the second specification, the macros are registered on a page unit basis, the raster development is performed by the macro execution, and the macros are deleted.

In LIPS language (registered trademark by Canon Inc.), as mentioned above, the above two specifications are supported and are switched in accordance with a using method. For example, when a form file of "*.ls4" is selected from a setting sheet of a property of a printer driver, commands are generated by the first specification. In case of printing from an application, for example, "Formcraft Pro. (registered trademark by Canon Inc.)" having the form overlay function, commands are generated in the second specification.

As disclosed in JP-A-10-285421 (Japanese Patent Application No. 09-286969), there is a printer driver having a function for, in case of printing, automatically discriminating a color processing mode such that a color print/ monochromatic print is performed on a page unit basis or a job unit basis.

To control the conventional overlay printing function from a host computer, although it is sufficient to transfer form data only once, a drawing process of the form data is necessary every page on the printer side, so that there are problems such that a load increases more and an advantage due to the mere reduction of the overlap transfer time of the form data cannot be effected and enough performance cannot be derived.

It is generally considered according to the printer that the macro deletion is performed at the end of the job, so that in case of performing the macro deletion in the second specification, there is a printer such that a process of next data is not performed until waiting for a paper ejection of the current page. In a printer for performing the printing process on a job unit basis, it depends on a low throughput based on the specification of the printer in which after waiting for the paper ejection at the end of the job, a data analysis of a next job is executed.

For example, in the current overlay printing function, since a color mode (color/mono) of the overlay form data which is formed is unconditionally determined, if the color mode of the data to be printed differs from the color mode of the overlay form data to be overlaid, the overlay print cannot be performed.

Therefore, in the case where the overlay print is performed in a color processing mode automatic discriminating process for automatically discriminating the color/mono mode on a page unit basis, there is a situation such that the print is stopped at a page in which the color mode of the data to be printed and the color mode of the overlay form data to be overlaid are different and the overlay print cannot be performed for all of the data. Thus, the user obtains an unexpected print result.

SUMMARY OF THE INVENTION

The invention is made to solve the foregoing problems and it is the first object of the invention to provide an information processing apparatus having a printer driver such that when using an overlay function of a printing apparatus, in the case where a form cache can be used in the printing apparatus, by generating commands by skipping overlap processes such as registration of form data, generation of a form raster image based on the form data, deletion of the form data, and the like, a printing process of a high throughput is controlled and to provide an information processing method of such an information processing apparatus and a storage medium in which a computer readable program has been stored.

The second object of the invention is to provide a print control apparatus such that when an overlay function is used on the basis of form data which is obtained from a data processing apparatus, by skipping the overlap processes such as registration of the form data, generation of a form raster image based on the form data, deletion of the form data, and the like, the overlapped vain data processes at the time of a form overlay printing process using the same form data which is derived from the data processing apparatus are eliminated, and a throughput can be remarkably improved and to provide a form data processing method for such print control apparatus and a storage medium in which a computer readable program has been stored.

The third object of the invention is to provide a print control apparatus such that when form data which is obtained from a data processing apparatus is registered, by identifying the form data which is overlappingly used over a plurality of pages and by skipping the overlap processes such as registration of the form data, generation of a form raster image based on the form data, deletion of the form data, and the like, the overlapped vain data processes at the time of a form overlay printing process using the same form data which is derived from the data processing apparatus are eliminated, a form overlay print processing efficiency of an output job that is inputted and the form raster image that is generated from the form data is raised, and a throughput can be remarkably improved and to provide a form data processing method for such print control apparatus and a storage medium in which a computer readable program has been stored.

According to a first aspect of the present invention, there is provided a print control apparatus which communicates with a data processing apparatus through a predetermined communication medium and can analyze an output job that is received, comprising: registering means for registering a plurality of form data which is transferred from the data processing apparatus into a memory; generating means for analyzing the form data registered in the memory by the registering means and generating a form raster image which is form-overlaid to each page of the output job; deleting means for deleting the form data registered in the memory by the registering means; setting means for setting the number of holding pages to be held in the memory every form data when each form data is registered into the memory; designating means for designating the form data which is used from the form data registered in the memory; and control means for skipping the registration of the same form data which is used by continuous pages into the memory by the registering means and the deletion of the registered same form data from the memory by the deleting means except for the designation of the form data by the designating means until the number of holding pages set by the setting means exceeds the number of print output pages.

According to a second aspect of the invention, the print control apparatus comprises: discriminating means for discriminating whether the same form data as the form data that is designated by the designating means has already been registered in the memory or not; and skip designating means for, when it is determined by the discriminating means that the same form data has already been registered in the memory, performing a skip designation to sequentially skip the registration of the same form data that is used in the continuous pages into the memory and the deletion of the registered same form data from the memory except for the designation of the form data by the designating means, wherein the control means skips the registration of the same form data that is used in the continuous pages into the memory by the registering means and the deletion of the registered same form data from the memory by the deleting means on the basis of the skip designating state by the skip designating means.

According to a third aspect of the invention, the print control apparatus has registration control means for downloading a plurality of form data accumulated in a specific area that is designated in memory resources at the time of the transfer of the form data from the data processing apparatus when a power source is turned on and for registering them into the memory.

According to a fourth aspect of the invention, there is provided a print control apparatus which communicates with a data processing apparatus through a predetermined communication medium and can analyze a page job or an output job that is received, comprising: registering means for registering color or monochromatic form data which is transferred from the data processing apparatus into a memory; generating means for analyzing the color or monochromatic form data registered in the memory by the registering means and generating a form raster image which is form-overlaid to each page of the output job; discriminating means for discriminating whether a color mode in the output job or page job coincides with a color mode of the form data or not before the raster image is generated by the generating means; changing means for changing a discrimination unit about the color mode by the discriminating means from a page unit to a job unit; and control means for controlling a form overlay print executing state on the basis of a discrimination result by the discriminating means.

According to a fifth aspect of the invention, there is provided an information processing apparatus which communicates with a print control apparatus through a predetermined communication medium and generates a job to be transmitted, comprising: discriminating means for discriminating whether a form raster image of form data which is used in the job has been held in the print control apparatus or not; and command issue control means for skipping a form execution command to execute a process to raster-generate the form data to the form raster image in the case where the form raster image has been held in the print control apparatus and issuing a form designation command.

According to a sixth aspect of the invention, the information processing apparatus further comprises obtaining means for obtaining information from the print control apparatus.

According to a seventh aspect of the invention, when information showing that the print control apparatus can hold the form raster image is obtained by the obtaining means, the discrimination by the discriminating means is performed.

According to an eighth aspect of the invention, when information showing that the print control apparatus cannot hold the form raster image is obtained by the obtaining means, the command issue control means issues a form execution command to execute a process to raster-generate the form data into the form raster image.

According to the ninth aspect of the invention, when the page in which the form data to be used in the job should be executed is processed, if the form data has been executed in the previous page, the discriminating means determines that the form raster image of the form data has been held in the print control apparatus.

According to a tenth aspect of the invention, there is provided an information processing apparatus which communicates with a print control apparatus through a predetermined communication medium and can generate a job to be transmitted, comprising: auto color mode instructing means for discriminating a color used in print data constructing the job on a page unit basis and instructing an auto color mode to allow a color processing mode in the print control apparatus to be decided on a page unit basis; overlay instructing means for instructing a form overlay print; and control means for allowing the auto color mode by the auto color mode instructing means to be determined as a color processing mode on a job unit basis in the case where the form overlay print is instructed by the overlay instructing means.

According to an eleventh aspect of the invention, the information processing apparatus further comprises generating means for generating the print data in accordance with a print request.

According to a twelfth aspect of the invention, the information processing apparatus further has: discriminating means for discriminating whether a color mode of the print data coincides with a color mode of the form data or not in the case where the form overlay print is instructed by the overlay instructing means and the print data is generated by the generating means; and control means for controlling whether the generating process of the print data by the generating means is continued or interrupted on the basis of a discrimination result by the discriminating means.

Further another aspect of the invention is applied to a method of realizing the above construction and a storage medium in which a computer readable program has been stored.

BRIEF DESCRIPTION OF THE DRAWINGS

FIG. 14 is a diagram for explaining a memory map in a storage medium to store various data processing programs which can be read out by a print system to which the print control apparatus according to the invention can be applied;

DETAILED DESCRIPTION OF THE PREFERRED EMBODIMENTS

A construction of a printing apparatus which can be applied to an embodiment of the invention will now be described hereinbelow.

Figure 1:
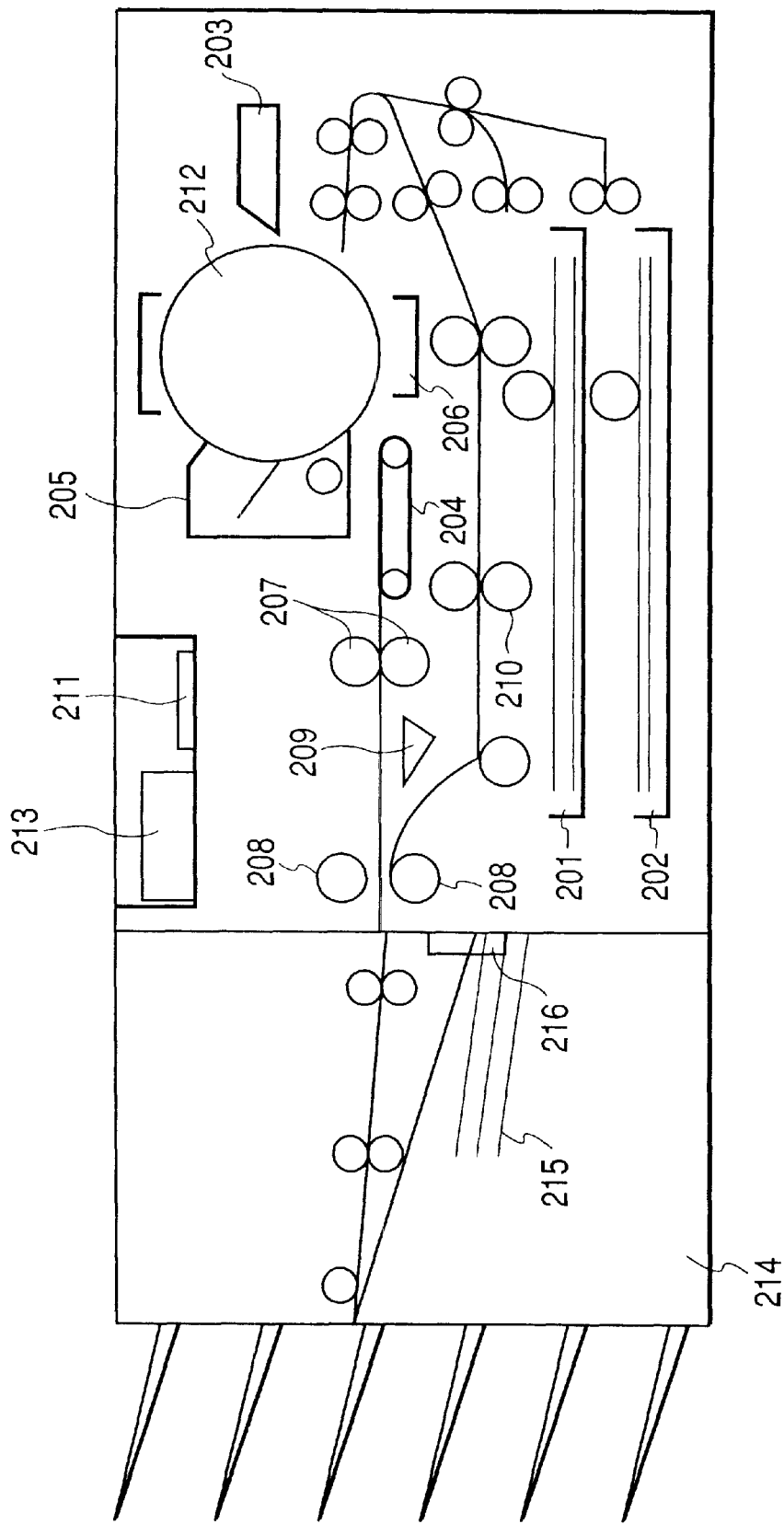
FIG. 1 is a schematic cross sectional view for explaining a construction of a printing apparatus which can be applied to a print control apparatus according to the invention.

FIG. 1 is a schematic cross sectional view for explaining the construction of the printing apparatus which can be applied to a print control apparatus according to the invention.

In the diagram, reference numerals 201 and 202 denote paper cassettes in each of which recording papers of a predetermined size are enclosed; 203 a developing unit for visualizing an electrostatic latent image formed on a photosensitive drum 212 by a developing agent; 204 a conveying belt for conveying the recording paper onto which the developing agent has been transferred by a transfer unit 206 toward a fixing unit 207; and 205 a cleaner for collecting the developing agent remaining on the photosensitive drum 212.

Reference numeral 209 denotes a direction control flapper for switching the feeding direction of the recording paper after completion of an image formation to either the direction of a staple stacker 214 or the direction of an intermediate tray 210. Reference numeral 211 denotes a laser emitting unit for emitting a laser beam which has been ON/OFF modulated on the basis of a video signal that is inputted from a laser driver 213. Reference numeral 208 denotes an ejecting roller for conveying the recording paper after completion of the image formation to the staple stacker 214.

In the staple stacker 214, a stapler 216 performs a stapling process to a bundle of recording papers which are ejected and stacks the stapled paper bundle onto a stacker 215.

In the printing apparatus constructed as mentioned above, the laser driver 213 drives the laser emitting unit 211, thereby allowing the laser emitting unit 211 to emit a laser beam according to image data received from a host computer, which will be explained hereinlater. The laser beam is irradiated onto the photosensitive drum 212, so that a latent image according to the laser beam is formed on the photosensitive drum 212. The developing agent is adhered to the portion of the latent image on the photosensitive drum 212 by the developing unit 203.

The recording paper is fed from either the cassette 201 or 202 at a timing synchronized with the start of irradiation of the laser beam and is conveyed to the transfer unit 206. The developing agent adhered on the photosensitive drum 212 is transferred to the recording paper. The recording paper with the developing agent is conveyed to the fixing unit 207. The developing agent is fixed to the recording paper by a heat and a pressure of the fixing unit 207. The recording paper which passed through the fixing unit 207 is ejected by the ejecting roller 208.

First Embodiment

Figure 2:
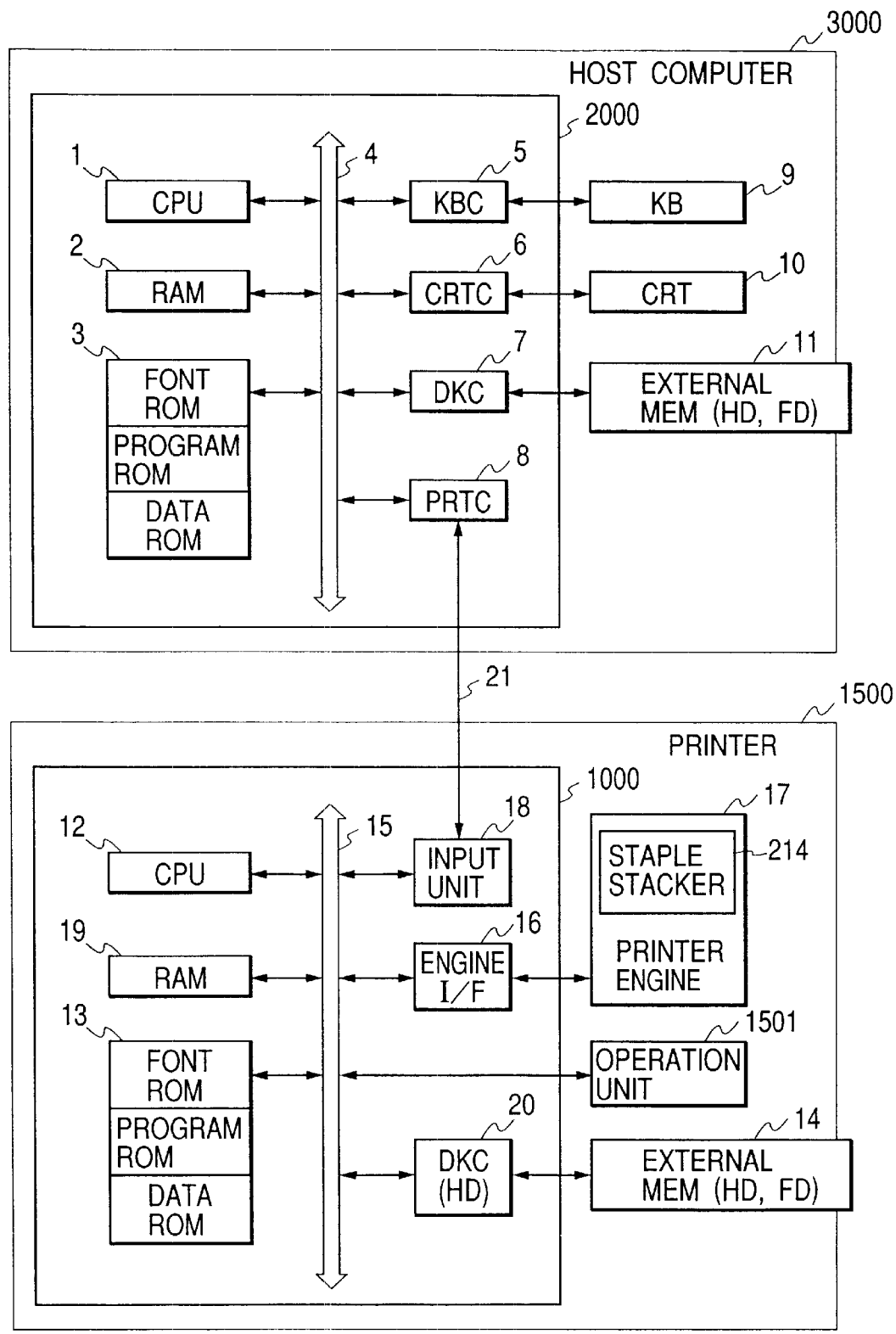
FIG. 2 is a block diagram for explaining a construction of a print system to which a print control apparatus showing the first embodiment of the invention can be applied.

FIG. 2 is a block diagram for explaining a construction of a print system to which the print control apparatus showing the first embodiment of the invention can be applied. For example, FIG. 2 corresponds to a print system in which a host computer 3000 and a printer 1500 can communicate through a predetermined communication medium.

In the host computer 3000, reference numeral 3 denotes an ROM. The ROM 3 comprises a font ROM in which bit map fonts and outline fonts have been stored, a program ROM, and a data ROM. A CPU 1 executes a document process of a document in which figures, images, characters, tables (including a spreadsheet and the like), etc. mixedly exist on the basis of a document processing program or the like stored in the program ROM in the ROM 3.

The CPU 1 also integratedly controls each device which is connected to a system bus 4. An RAM 2 functions as a main memory, a work area, or the like of the CPU 1 and its capacity can be expanded by an option RAM.

Reference numeral 5 denotes a keyboard controller (KBC) for controlling a key input from a keyboard 9 or a pointing device (not shown). A CRT controller (CRTC) 6 controls a display of a CRT display 10. An installation picture plane of a printer, which will be explained hereinlater, is also displayed on the CRT 10.

A disk controller (DKC) 7 controls an access to an external memory 11 such as hard disk (HD), floppy disk (FD), or the like to store a boot program, various applications, a printer driver program of the invention, font data, a user file, an edition file, and the like.

A printer controller (PRTC) 8 is connected to the printer 1500 through a predetermined bidirectional interface (bidirectional I/F) 21 and executes a communication control process with the printer 1500. The bidirectional interface 21 can also connect the host computer 3000 and printer 1500 by a network so that they can communicate. In this case, a print server having a construction similar to that of the host computer is provided on the network and the order of print jobs to the network printer 1500 is managed by the print server.

The CPU 1 executes, for example, a developing (rasterizing) process of the outline fonts into the display information RAM set on the RAM 2, thereby enabling the WYSIWYG (function to make the display contents coincide with the print contents) on the CRT 10 to be realized.

The CPU 1 not only executes programs to realize procedures of flowcharts, which will be explained hereinlater, but also executes various data processes by opening various registered windows on the basis of commands instructed by a mouse cursor or the like (not shown) on the CRT 10.

In the printer 1500, reference numeral 12 denotes a printer CPU. The printer CPU 12 integratedly controls accesses to various devices connected to a system bus 15 on the basis of control programs or the like stored in the program ROM in an ROM 13 and generates an image signal as output information to a printer engine 17 which is connected through an engine interface 16.

The CPU 12 can communicate with the host computer through the bidirectional interface 21 and can notify the host computer 3000 of information or the like in the printer 1500. Even when the interface 21 is a network, although it is also possible to construct in a manner such that the information in the printer 1500 can be also notified as MIB information by a utility application or the like in the host computer, its details are omitted here.

An RAM 19 functions as a main memory, a work area, or the like of the CPU 12 and its capacity can be expanded by an option RAM. An input unit 18 controls a communication of status information such as print status information or the like through the host computer 3000 and bidirectional interface 21 and can notify the host computer 3000 of the information or the like in the printer. When the interface 21 is a network, a network board corresponds to the input unit 18.

A disk controller (DKC) 20 controls accesses to an external memory 14 such as hard disk (HD), floppy disk (FD), or the like to store a boot program, various applications, font data, a user file, an edition file, and the like. An operation unit 1501 includes a display panel and a keyboard and is used to provide information to the operator and perform an instruction input from the operator. As will be explained hereinlater, form data of a macro format transmitted from the host computer has been stored in the external memory 14 and, further, a form raster image in which the form data has been rasterized on the basis of a form data generation command has also been stored.

Figure 3:
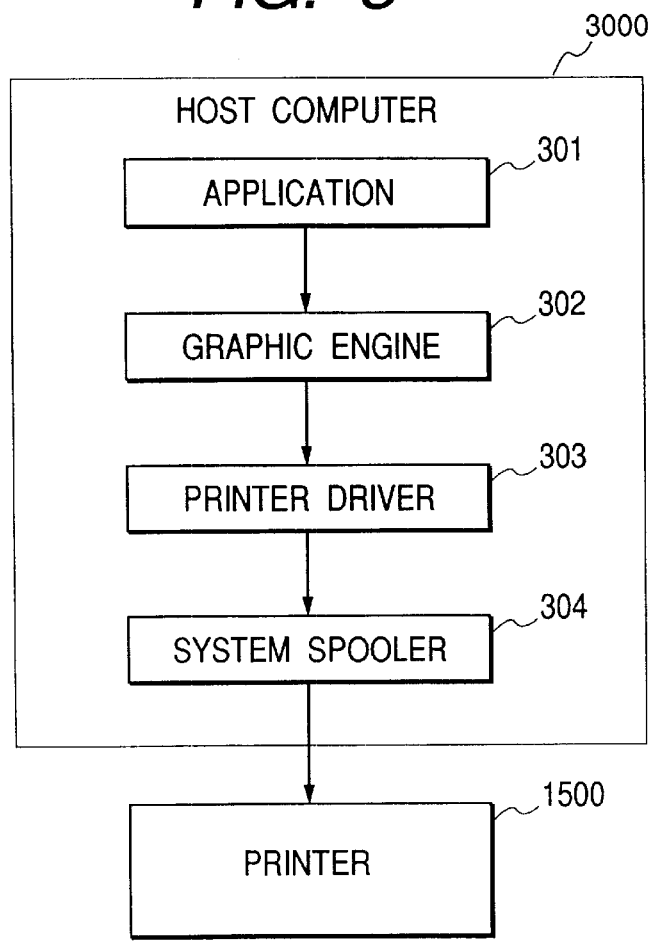
FIG. 3 is a diagram for explaining a correspondence of a print processing module in a host computer shown in FIG. 2.

In the print system constructed as mentioned above, a construction on the software to print by the host computer 3000 is as shown in FIG. 3.

FIG. 3 is a diagram for explaining a correspondence of a print processing module in the host computer 3000 shown in FIG. 2. The same component elements as those shown in FIG. 1 are designated by the same reference numerals. A construction and the operation will now be described hereinbelow.

In the diagram, print data generated by an application 301 is sent to a graphic engine 302 as a part of the operating system by a print request from the application. A data format which is sent here is a GDI function in case of, for example, "Windows" (registered trademark of Microsoft Co., Ltd. of U.S.A.) and the graphic engine is generally called a GDI (Graphical Device Interface). The graphic engine 302 replaces it by a DDI (Device Driver Interface) function and outputs to a printer driver 303 to generate print data that can be interpreted by the printer 1500.

The printer driver 303 generates print data as data that is peculiar to the printer on the basis of the DDI function obtained from the graphic engine (GDI) and transfers the generated print data to a system spooler 304. The system spooler spools the print data and sends the print data to the printer in accordance with a schedule of the printer. At this time, the printer driver transmits information to control an overlay print or the like to the printer 1500 together with the print data in accordance with a procedure, which will be explained hereinlater, on the basis of the setting from the application or the like.

Figure 4:
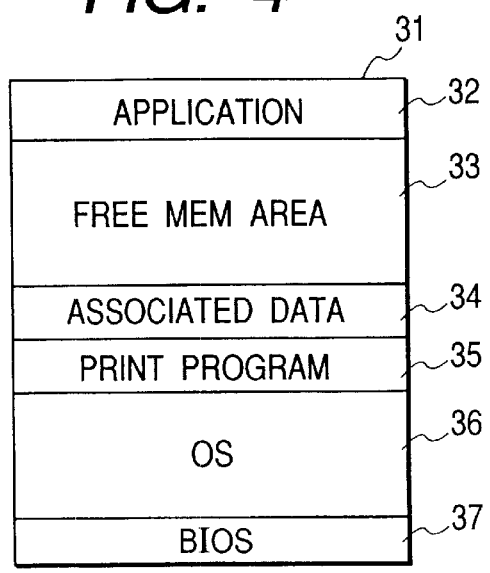
FIG. 4 is a diagram showing an example of a memory map in an RAM at the time of printing in the host computer shown in FIG. 2 or at the time of setting of a printer.

FIG. 4 is a diagram showing an example of a memory map in the RAM 2 at the time of printing in the host computer 3000 shown in FIG. 2 or at the time of setting of the printer 1500.

In the diagram, reference numeral 31 denotes an RAM area and 32 indicates an application corresponding to a program area to print by using an OS 36 and a print program (printer driver) 35.

Reference numeral 37 denotes a BIOS called a basic input/output system corresponding to a program area to drive a parallel interface, a serial interface, or the like which is connected to the printer 1500. Reference numeral 34 denotes associated data corresponding to an area in which not only set information for printing such as paper size, layout information, and the like but also set information regarding a color processing mode automatic discriminating process, which will be explained hereinlater, and an overlay printing process which are set and used by the application or the like are stored.

A characteristic construction of the embodiment will now be described hereinbelow.

There is provided a print control apparatus with the above construction which communicates with the data processing apparatus through a predetermined communication medium and can analyze an output job that is received, comprising: registering means for registering a plurality of form data which is transferred from the data processing apparatus into a memory (RAM 19 or external memory 14) (the CPU 12 executes a print control program that is stored in the ROM 13 or external memory 14 and executes a registering process); generating means for analyzing the form data registered in the memory by the registering means and generating a form raster image which is form-overlaid to each page of the output job (the CPU 12 executes a print control program that is stored in the ROM 13 or external memory 14 and executes a generating process); setting means for setting the number of holding pages to be held in the memory every form data when each form data is registered into the memory (the CPU 12 executes a print control program that is stored in the ROM 13 or external memory 14 and executes a setting process); designating means for designating the form data to be used from the form data registered in the memory (the CPU 12 executes a print control program that is stored in the ROM 13 or external memory 14 and executes a designating process); and control means for skipping the registration of the same form data which is used in continuous pages into the memory by the registering means and the deletion of the registered same form data from the memory by the deleting means except for the designation of the form data by the designating means until the number of holding pages set by the setting means exceeds the number of print output pages (the CPU 12 executes a print control program that is stored in the ROM 13 or external memory 14 and executes a skipping process). Therefore, in the case where pages are continuous in the output job using the same form data as the registered form data, the registering process of the overlapped form data, the rasterizing process based on the registered form data, and the deleting process of the form data are avoided. The raster processing time of each page accompanied with the form overlay can be remarkably reduced. A throughput can be improved as compared with that in case of the conventional form overlay function (using the macro data) using the form data.

The print control apparatus has: discriminating means for discriminating whether the same form data as the form data which is designated by the designating means has already been registered in the memory or not (the CPU 12 executes a print control program that is stored in the ROM 13 or external memory 14 and executes a discriminating process); and skip designating means for, when it is determined by the discriminating means that the same form data has already been registered in the memory, performing a skip designation to sequentially skip the registration of the same form data which is used in continuous pages into the memory and the deletion of the registered same form data from the memory except for the designation of the form data by the designating means (the CPU 12 executes a print control program that is stored in the ROM 13 or external memory 14 and executes a skip designating process), wherein the CPU 12 skips the registration of the same form data which is used in the continuous pages into the memory by the registering means and the deletion of the registered same form data from the memory by the deleting means on the basis of a skip designation state. Therefore, in the case where pages are continuous in the output job using the same form data as the registered form data, the registering process of the overlapped form data, the rasterizing process based on the registered form data, and the deleting process of the form data can be efficiently avoided.

The print control apparatus further comprises registration control means for downloading a plurality of form data accumulated in a specific area which is designated in memory resources (external memory 11 or the like) at the time of the transfer of the form data from the host computer 3000 and registering into the memory (RAM 19, external memory 14, etc.) at the time of turn-on of a power source (the CPU 12 executes a print control program that is stored in the ROM 13 or external memory 14 and performs a registration control). Therefore, the form data in which a probability such that it is used as form data is high is obtained at the time of turn-on of the power source, a situation such that the same form data is transferred is avoided, and a transfer amount of the form data at the time of the output job process can be reduced.

There is provided a print control apparatus which communicates with a data processing apparatus through a predetermined communication medium and can analyze a page job or an output job that is received, comprising: registering means for registering color or monochromatic form data which is transferred from the data processing apparatus into a memory (RAM 19, external memory 14, etc.) (the CPU 12 executes a print control program that is stored in the ROM 13 or external memory 14 and executes a registering process); generating means for analyzing the color or monochromatic form data registered in the memory by the registering means and generating a form raster image to be form overlaid to each page of the output job (the CPU 12 executes a print control program that is stored in the ROM 13 or external memory 14 and executes a generating process); discriminating means for discriminating whether a color mode in the output job or page job coincides with a color mode of the form data or not before the raster image is generated by the generating means (the CPU 12 executes a print control program that is stored in the ROM 13 or external memory 14 and executes a discriminating process); changing means for changing a discrimination unit about the color mode by the discriminating means from a page unit to a job unit (the CPU 12 executes a print control program that is stored in the ROM 13 or external memory 14 and executes a changing process); and control means for controlling a form overlay print execution state on the basis of a discrimination result by the discriminating means (the CPU 12 executes a print control program that is stored in the ROM 13 or external memory 14 and executes a control process). Therefore, even when the color mode differs every page, a situation such that the printing process is stopped can be certainly avoided.

There is provided an information processing apparatus (host computer 3000) with the above construction which communicates with a print control apparatus through a predetermined communication medium and forms a job to be transmitted, comprising: discriminating means for discriminating whether a form raster image of form data which is used in the job has been held in the print control apparatus or not (the CPU 1 executes a printer driver program stored in the ROM 3 or external memory 11 and discriminates); and command issue control means for, when the form raster image has been held in the print control apparatus, skipping a form execution command to execute a process to raster-generate the form data into the form raster image and issuing a form designation command (the CPU 1 executes a printer driver program stored in the ROM 3 or external memory 11 and controls). Therefore, the print data can be generated by a command which can effectively use the form raster image of the print control apparatus and a print throughput is improved.

Since the information processing apparatus further comprises obtaining means for obtaining information from the print control apparatus, transmission and reception of the information to/from the print control apparatus can be performed and a form cache can be more accurately used.

In the case where information showing that the print control apparatus can hold the form raster image is obtained by the obtaining means, the discrimination by the discriminating means is performed, so that a vain discriminating process is reduced and a throughput when the print data is generated is improved.

When information showing that the print control apparatus cannot hold the form raster image is obtained by the obtaining means, the command issue control means issues the form execution command to execute the process to raster-generate the form data into the form raster image. Therefore, even when the form cache cannot be used, the form overlay print can be used.

When a page in which the form data to be used in the job should be executed is processed, if the form data has been executed in the previous page, the discriminating means determines that the form raster image of the form data has been held in the print control apparatus, so that even in one job, the vain form raster generating process is reduced and a print throughput is improved.

There is also provided an information processing apparatus which communicates with a print control apparatus through a predetermined communication medium and can generate a job to be transmitted, comprising: auto color mode instructing means for discriminating a color used in print data constructing the job on a page unit basis and instructing an auto color mode to allow a color processing mode in the print control apparatus to be determined on a page unit basis; overlay instructing means for instructing a form overlay print; and control means for, when the form overlay print is instructed by the overlay instructing means, allowing the auto color mode instructed by the auto color mode instructing means to be determined as a color processing mode on a job unit basis. Therefore, even in case of using the auto color mode, a situation such that the print becomes impossible because the color processing mode differs every page is eliminated.

The information processing apparatus further has: generating means for generating print data in accordance with a print request; discriminating means for discriminating whether a color mode of the print data coincides with a color mode of the form data or not in the case where the form overlay print is instructed by the overlay instructing means and the print data is generated by the generating means; and control means for controlling whether the generating process of the print data by the generating means is continued or interrupted on the basis of a discrimination result by the discriminating means. Therefore, when the color processing mode does not coincide, since such a fact can be discriminated at the first of the job, the vain print output can be eliminated.

Figure 5:
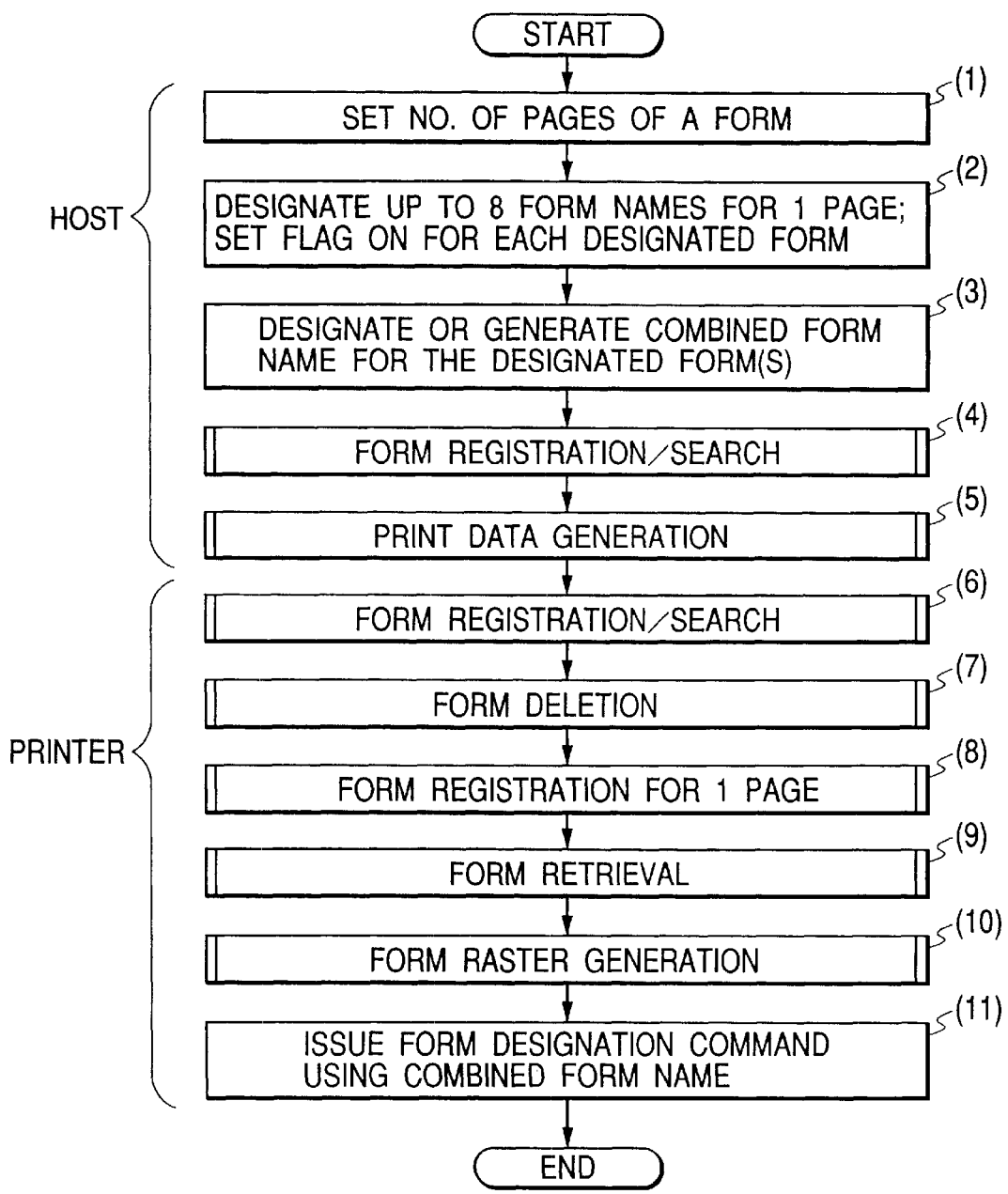
FIG. 5 is a flowchart showing an example of a flow for the first data processing procedure in an information processing apparatus and the print control apparatus according to the invention.

FIG. 5 is a flowchart showing an example of the first data processing procedure in the information processing apparatus and print control apparatus according to the invention and corresponds to a form cache function processing procedure. Reference numerals (1) to (11) denote processing steps and this processing routine is executed every page. Form cache data (rasterized data) denotes a final image data which is generated by developing form data as macro data. The printer holds it in an image data format in the memory. The image data held in the memory of the printer can be also compressed. This is because since the time that is required to decompress the compressed data is very short, it hardly becomes a burden on the time which is required to rasterize data to be added later.

First in step (1), the printer driver of the information processing apparatus allows the number of registered holding pages of a form name which is designated by an application or the like in step (2), which will be explained hereinlater, to be set. For example, when the number of registration holding pages is equal to "3", all of the forms designated by such a page are held in the printer memory by an amount corresponding to three pages without being deleted and, after that, they are deleted. Specifically speaking, the print data generating unit of the printer driver obtains the number of registered holding pages set by the user in the setting of the application or printer driver and sets it into a print attribute.

Figure 15:
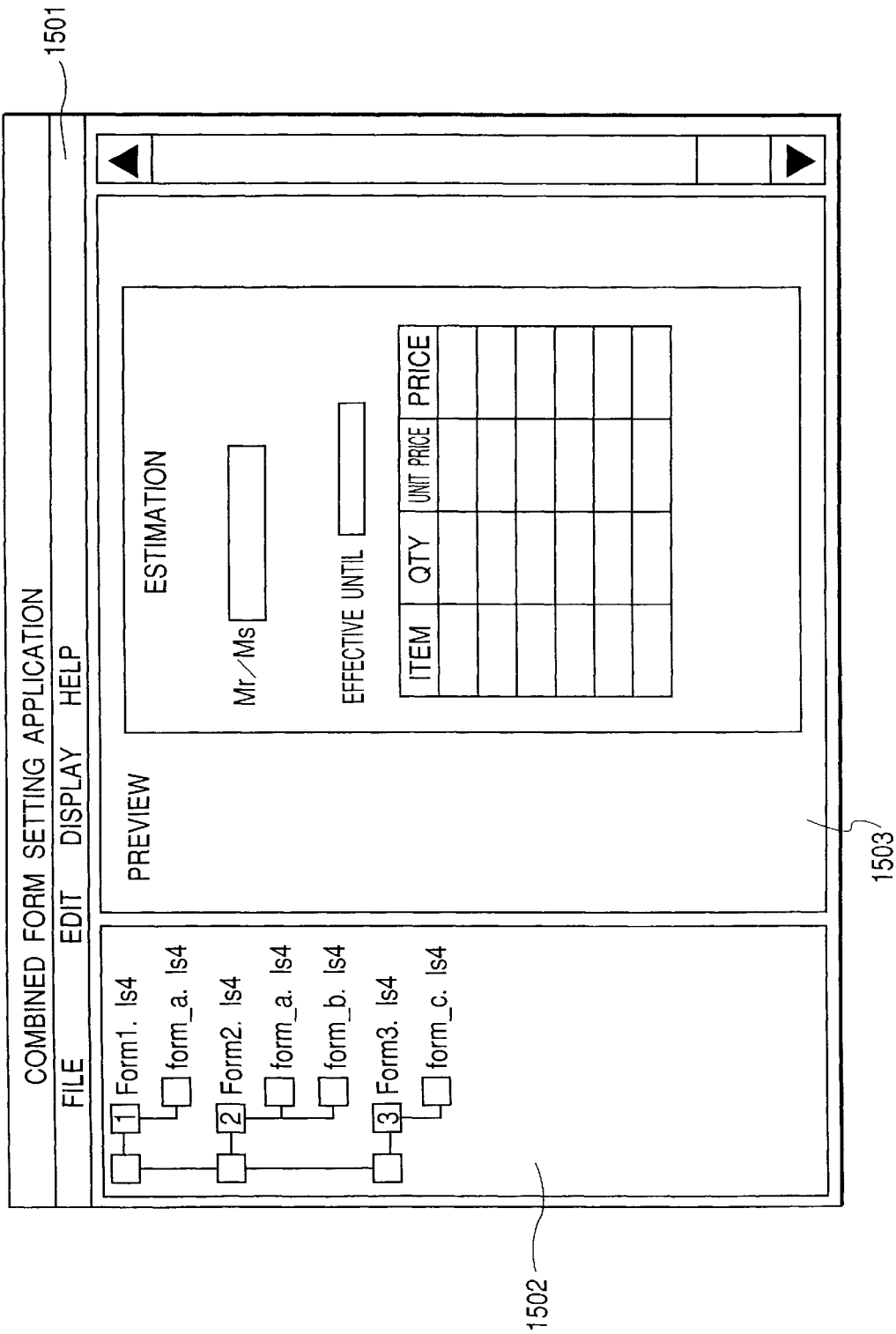
FIG. 15 is a user interface diagram for explaining a picture plane when a plurality of forms are designated by an application in the information processing apparatus of the invention.

In next step (2), up to eight form names of the forms to be overlaid to the data to be added later in one page are designated by the application, printer driver, or the like. For the designated forms, a form use flag is turned on in the driver. FIG. 15 shows a specific example, FIG. 15 shows a user interface on the CRT 10 by a document editing application which can designate the form overlay. On this picture plane, the user can designate which form file is used for each page.

In FIG. 15, reference numeral 1501 denotes a menu including "FILE", "EDIT", "DISPLAY", and "HELP". In the menu of "EDIT", either a mode to add a new page or a mode to add a file to be overlaid to the pages which have already existed can be designated.

Reference numeral 1502 denotes an object tree showing which form file (form data) is used for each page. In the display of FIG. 15, form data of a form name "form_a.ls4" is designated for the first page, a combined form name of this page is "Form1.ls4", form data of form names "form_a.ls4" and "form_b.ls4" are designated for the second page, and a combined form name of this page is "Form2.ls4". Although this picture plane shows a case where the user designate by an application, the invention is not limited to such an example but the printer driver can automatically form a name of a combined form.

In step (3), a combined form name to collectively register the form names designated in step (2) is designated as shown in FIG. 15 or generated in the driver.

Subsequently, in step (4), the printer driver of the information processing apparatus as a host computer 3000 executes a form registration/search process in one job shown in FIG. 16, which will be explained hereinlater. In step (5), a print data generating process based on a generating process shown in step (8) in FIG. 16, which will be explained hereinlater, is executed. The generated print data is transmitted to the print control apparatus as a printer 1500 and the processing routine is finished.

Processes in step (6) and subsequent steps relate to a control of the print control apparatus. In step (6), the print control apparatus executes the form registration/search process shown in FIG. 6, which will be explained hereinlater. In step (7), a form deleting process shown in FIG. 7, which will be explained hereinlater, is performed. In step (8), a form registering process which is used in one page shown in FIG. 8, which will be explained hereinlater, is performed. In step (9), a form retrieving process shown in FIG. 9, which will be explained hereinlater, is performed. In step (10), a form raster generating process shown in FIG. 10, which will be explained hereinlater, is performed. In step (11), a form designation command is issued by using the combined form name and a printing process is performed. When the form raster exists in the printer memory, it is used. Even when there is no form raster, if the form data has been registered, the form data is used, the data to be added later is overlaid, and an overlay print is performed. The processes of the print control apparatus are finished.

Figure 16:
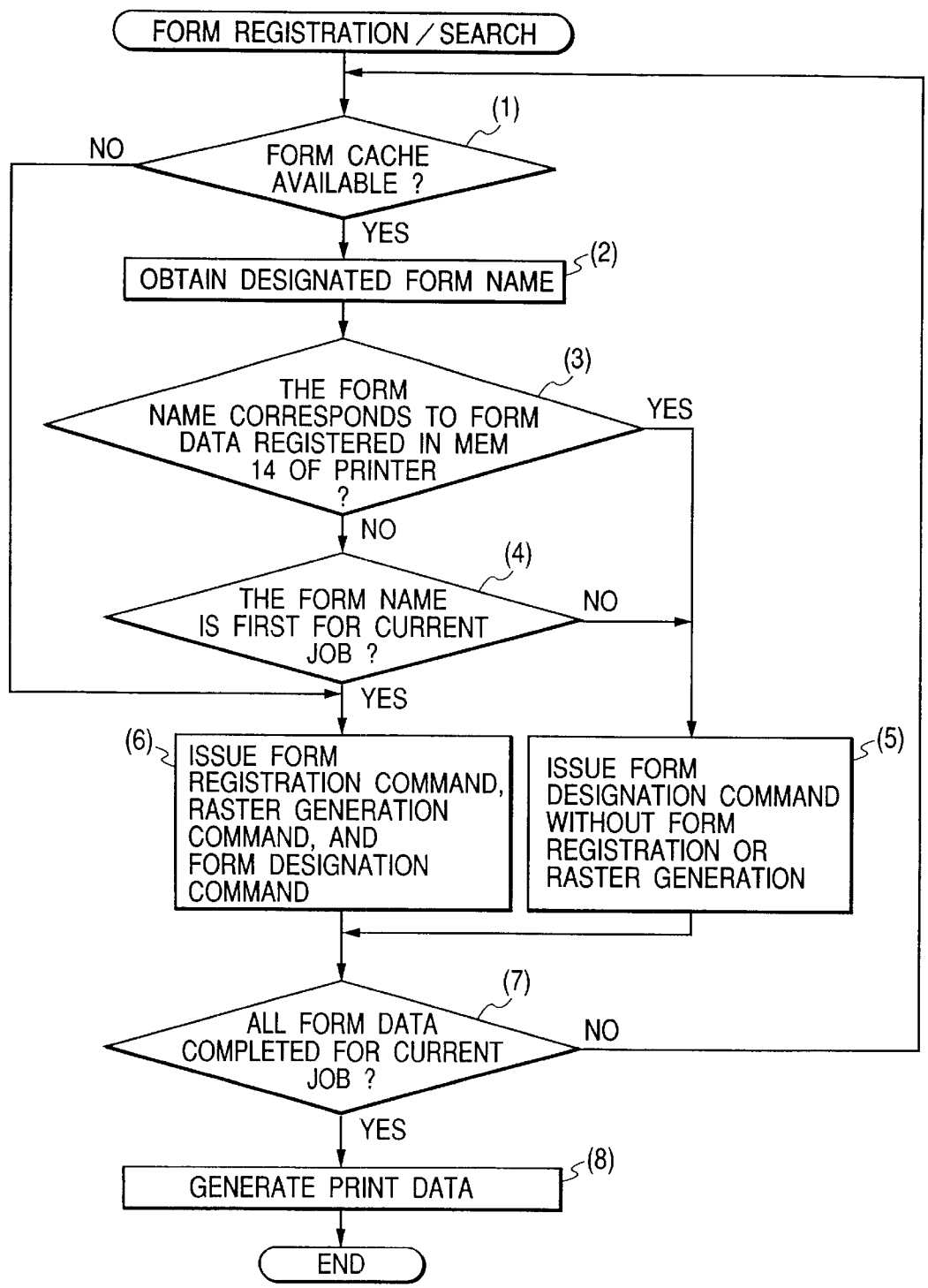
FIG. 16 is a flowchart showing an example of a data processing procedure in the information processing apparatus according to the invention.

FIG. 16 is a flowchart showing an example of the second data processing procedure in the information processing apparatus according to the invention and corresponds to a detailed procedure of a form registration/search process in one job. Reference numerals (1) to (8) denote processing steps.

First in step (1), the print control apparatus as a printer on the output destination side discriminates whether a form cache can be performed or not. Since the printer driver is peculiar to the printer, whether the printer of the output destination of itself has the form caching function or not can be discriminated by the information held in the driver.

Figure 17:
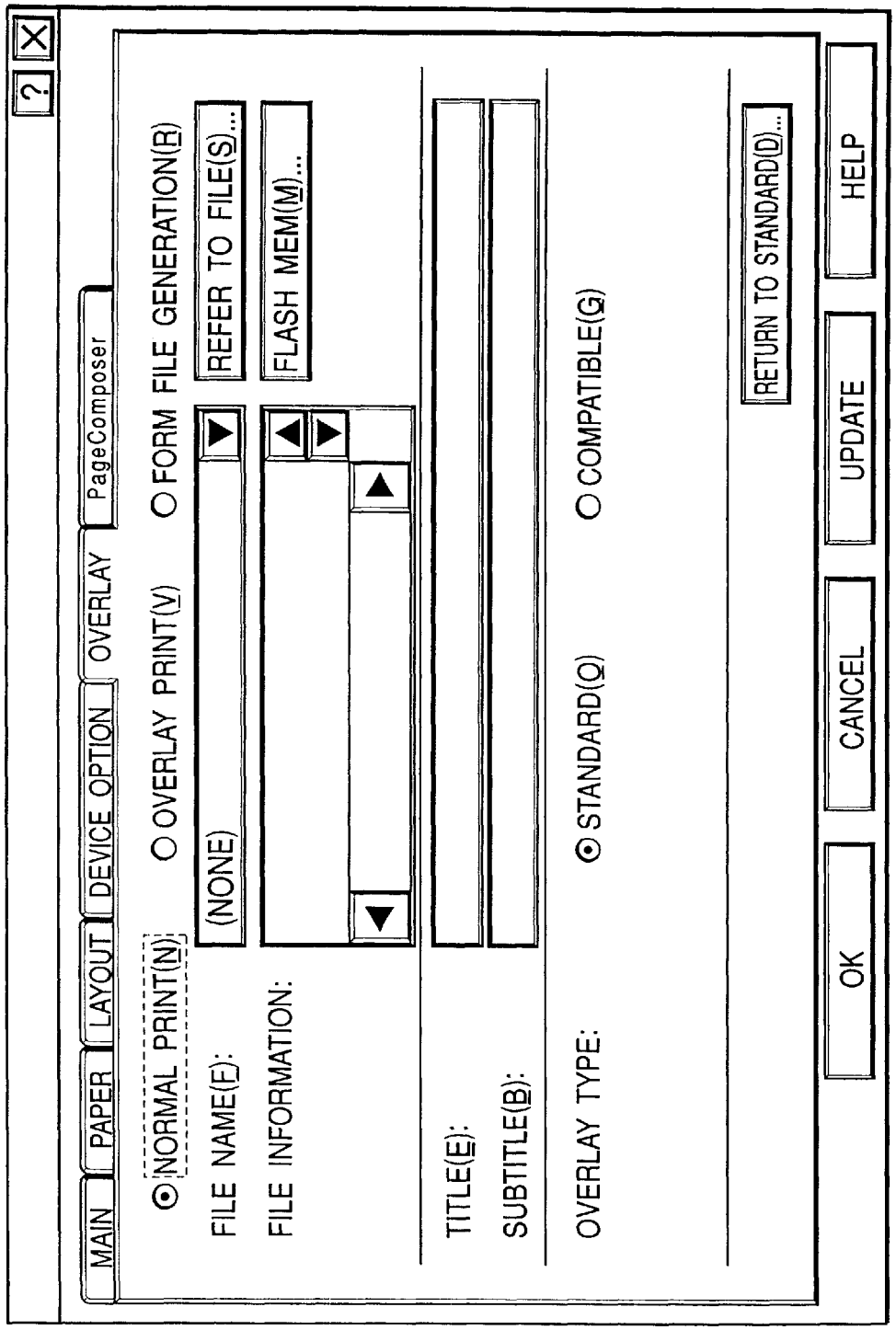
FIG. 17 is a user interface diagram for explaining a picture plane when a print format and a form file are selected by a printer driver in the information processing apparatus of the invention.

However, even in the printer having the form caching function, unless it is in a state where the external memory 14 is attached and can be used as an expanded memory, there is a situation such that the memory is insufficient and the form cache cannot be performed. Therefore, in the user interface of the printer driver as shown in FIG. 17, whether the external memory has been expanded or not can be checked. In this picture plane, the user designates the overlay print in the property of the printer driver. When "overlay print" is selected, a file name is designated. From "refer to file", the form data in the information processing apparatus as a host computer can be selected. From "flash memory", the form name registered in the external memory 14 in the print control apparatus as a printer can be selected. As mentioned above, the form data which has already been registered in the print control apparatus can be recognized by the printer driver of the information processing apparatus through the communicating means 21 which can bidirectionally communicate. If the external memory 14 has been expanded in the print control apparatus, a picture plane is displayed in a state where the form name can be selected from "flash memory".

When it is determined in step (1) that the print control apparatus of the output destination is a printer which can perform the form cache, the form name designated in step (2) in FIG. 5 is obtained in step (2). Subsequently, in step (3), a check is made to see if the designated form name is the form data registered and held in the external memory 14 in the print control apparatus 1500. When it is designated in the item of "flash memory" in FIG. 17, the processing routine advances to step (5). When it is designated in the item of "refer to file" in FIG. 17, the processing routine advances to step (4).

In step (4), a check is made to see if the designated form data is a form name which is designated first in the job of the current print request. That is, in case of the job comprising of a plurality of pages, since there is a case where the same form is used in a plurality of pages, the above discrimination is performed. In case of the form name which is designated first, step (6) follows. In case of the form name which has been designated before in the previous page, step (5) follows.

In step (5), in the page during the process of the current print job, since it is handled as a page that is overlaid to the form raster image which has already been generated, the printer driver of the information processing apparatus skips the processes of the registration of the form data and the generation of the form raster and issues only the command for the form designation.

In step (6), in the page during the process of the current job, since it is handled as a page that is overlaid to the form data without the form raster image which has been raster-generated in the printer, the printer driver of the information processing apparatus issues all of the commands for the form data registration, form raster generation, and form designation.

In subsequent step (7), a check is made to see if the above processes have been performed with respect to all of the form data in the current print job. When there is remaining form data, the processing routine is returned to step (1) and the above processes are executed with regard to all of the form data in the job. When the above processes are performed with respect to all of the form data in the job, the processing routine advances to step (8).

Step (8) corresponds to the process in step (5) in FIG. 5 and the print data is generated on the basis of the form registration command, form raster generation command, and form designation command set by the processes in steps (1) to (7) in FIG. 16. The application 301 to perform the print request sends the data to be added later as a DDI function via the graphic engine 302 and also sends the form name. If the form data designated by the form name has already been registered in the external memory of the printer 1500, only the form name is sent. However, in case of the form data which is not yet registered in the print control apparatus as a printer, the form data itself is sent as a DDI function together with the form name. On the basis of those DDI functions, the printer driver 303 generates the print data which can be interpreted by the printer 1500.

Although the print data constructing the job comprises the form registration command, form data, form raster generation command, form designation command, and data to be added later, the print data existing in the form cache of the printer comprises only the form designation command and the data to be added later. As described in the flowchart of FIG. 16, in case of the printer which can use the form cache, since the form cache is used even in one job, in case of the form data used in the page before one job, the print data does not have the form raster generation command but has only the form designation command. Therefore, in the printer, since there is no need to raster-generate the form, the print throughput is improved. If the print data is generated in step (8) in FIG. 16 so as to register the form data at the first of the job instead of registering it to a position just before the print data of the page to be used, even in the printer which cannot use the form cache, the macro deletion is not performed every page. Therefore, a delay of the data process due to the waiting for the paper ejection between pages is eliminated, so that the print throughput is improved.

Figure 6:
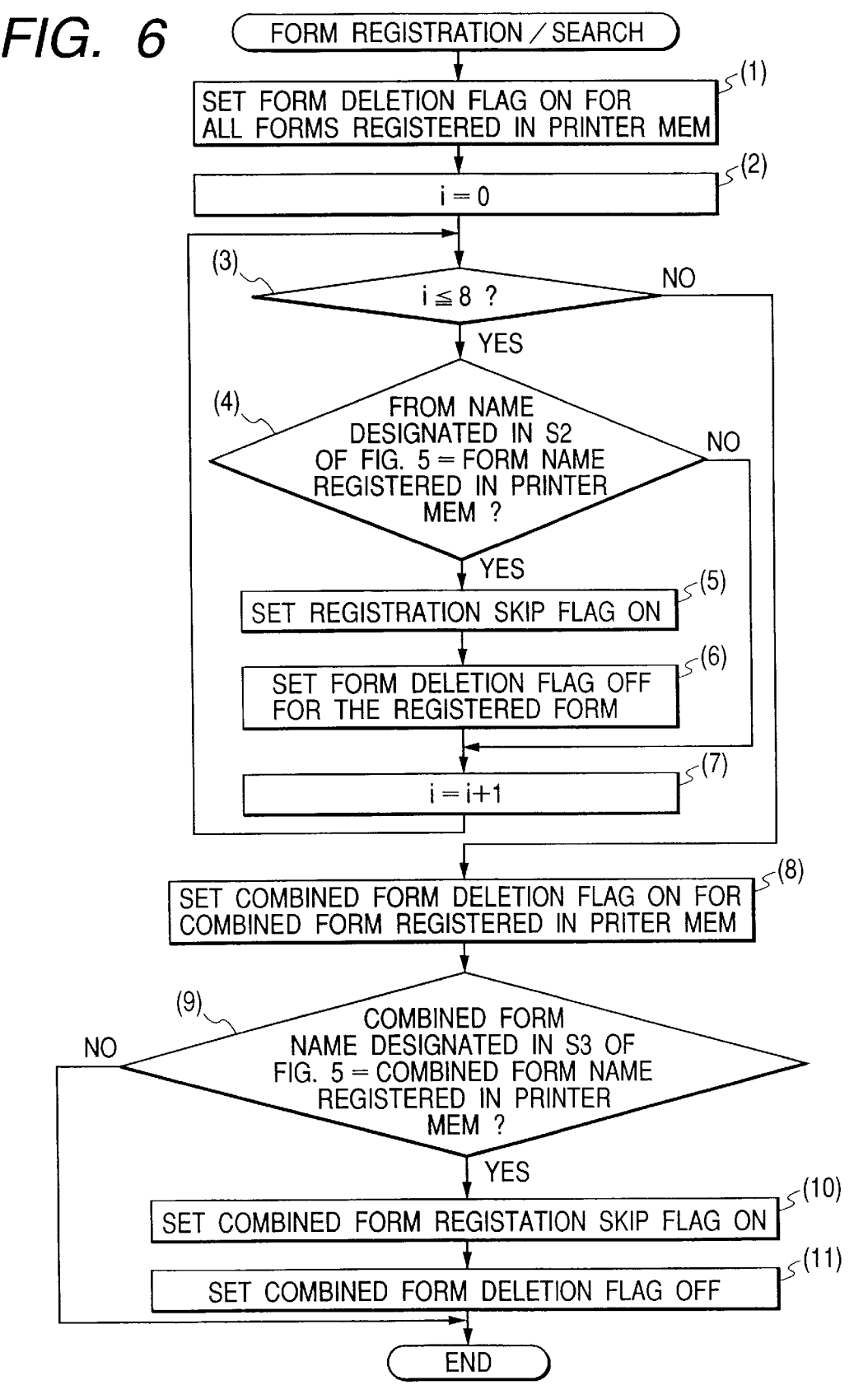
FIG. 6 is a flowchart showing an example of the second data processing procedure in the print control apparatus according to the invention.

FIG. 6 is a flowchart showing an example of a second data processing procedure in the print control apparatus according to the invention and corresponds to the detailed procedure of the form registration/search process. Reference numerals (1) to (11) show processing steps.

First in step (1), all of the form deletion flags registered in the printer memory are turned on. Steps (2) to (7) correspond to a process for comparing the form name designated in step (2) in FIG. 5 with the form names registered in the printer memory. In step (2), a parameter i is initialized and whether the parameter i is equal to or less than "8" or not is discriminated. If NO, the processing routine advances to step (8) and subsequent steps.

When it is determined in step (3) that the parameter i is equal to or less than "8", a check is made in step (4) to see if the form names coincide with the up to eight forms which have already been registered in the printer memory. If it is decided that the names do not coincide, step (7) follows and the parameter i is increased by "1". The processing routine is returned to step (3).

When it is decided in step (4) that the names coincide, a registration skip flag of the form designated in step (2) shown in FIG. 5 is turned on in step (5). In step (6), a deletion flag of the forms registered in the printer memory is turned off.

This means that, fundamentally, although as for the registered forms, the deletion is performed every page and the registration is performed every page, in the case where the same form name as the form name used in the previous page is also used in the next page, the deletion of the form is not performed and the registration in the next page is also not performed. The above processes are repeated the number of times as many as eight forms which can be used in one page.

In step (8), a deletion flag of the combined form registered in the printer memory is turned on. In step (9), the name of the combined form designated in step (3) shown in FIG. 5 is compared with the combined form names registered in the printer memory, thereby discriminating whether the form of the same name has already been registered or not. If it is determined that such a form is not yet registered, the processing routine is finished.

When it is decided in step (9) that the form of the same name has already been registered, a registration skip flag of the combined form is turned on in step (10). A deletion flag of the combined form registered in the printer memory is turned off in step (11). The form registration/search process is finished.

In the form registration/search process, thus, the form data in the printer memory is not deleted and, at the same time, the form registering process is skipped. As mentioned above, since the process to search the overlap of the form which is similar to the printer driver of the information processing apparatus is executed even on the printer side, even in case of the form overlay process from the printer driver which does not have the overlap search processing function of the form because of the old version, the form raster is not generated in vain and the form cache can be effectively used. Therefore, the print throughput can be improved.

Figure 7:
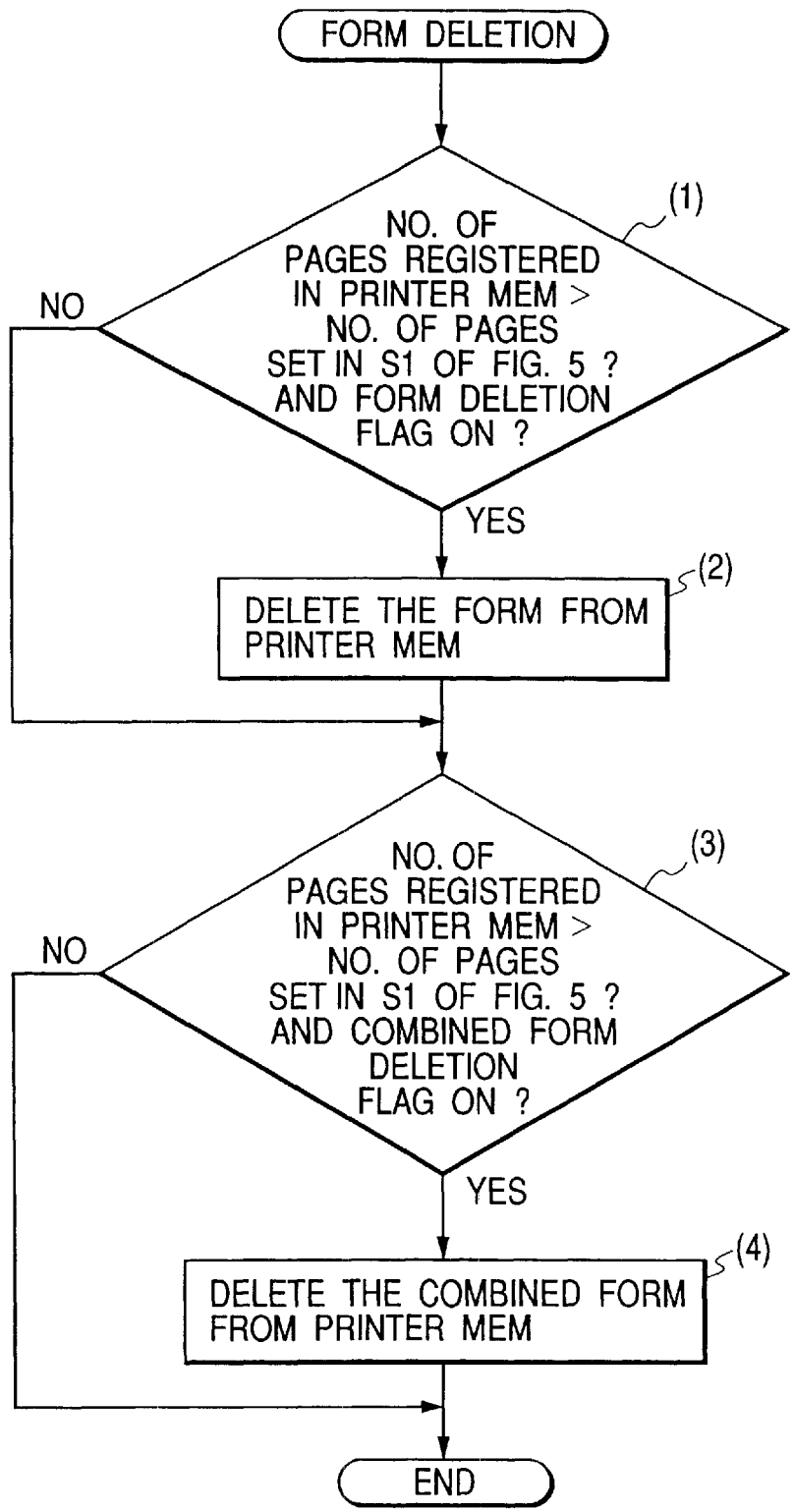
FIG. 7 is a flowchart showing an example of the third data processing procedure in the print control apparatus according to the invention.

FIG. 7 is a flowchart showing an example of the third data processing procedure in the print control apparatus according to the invention and corresponds to a detailed procedure for the form deleting process shown in FIG. 5. Reference numerals (1) to (4) denote processing steps.

First in step (1), the number of registered holding pages designated in step (1) shown in FIG. 5 is compared with the number of print pages of the form registered in the printer memory (how many pages are held). When it is determined that the number of print pages is not larger than the number of registered holding pages, step (3) follows.

The form in the case where it is decided in step (1) that the number of print pages is larger and in which the deletion flag of the form data is ON in the form registration/search process in step (6) shown in FIG. 5 is deleted from the printer memory by the form deletion command in step (2).

In step (3), the number of registered holding pages is compared with the number of print pages of the form registered in the printer memory (how many pages are held). The combined form in the case where it is decided in step (3) that the number of print pages is larger than the number of registered holding pages and in which the deletion flag of the form data is ON in step (6) shown in FIG. 5 is deleted from the printer memory by the form deletion command. The form deleting process is finished.

Figure 8:
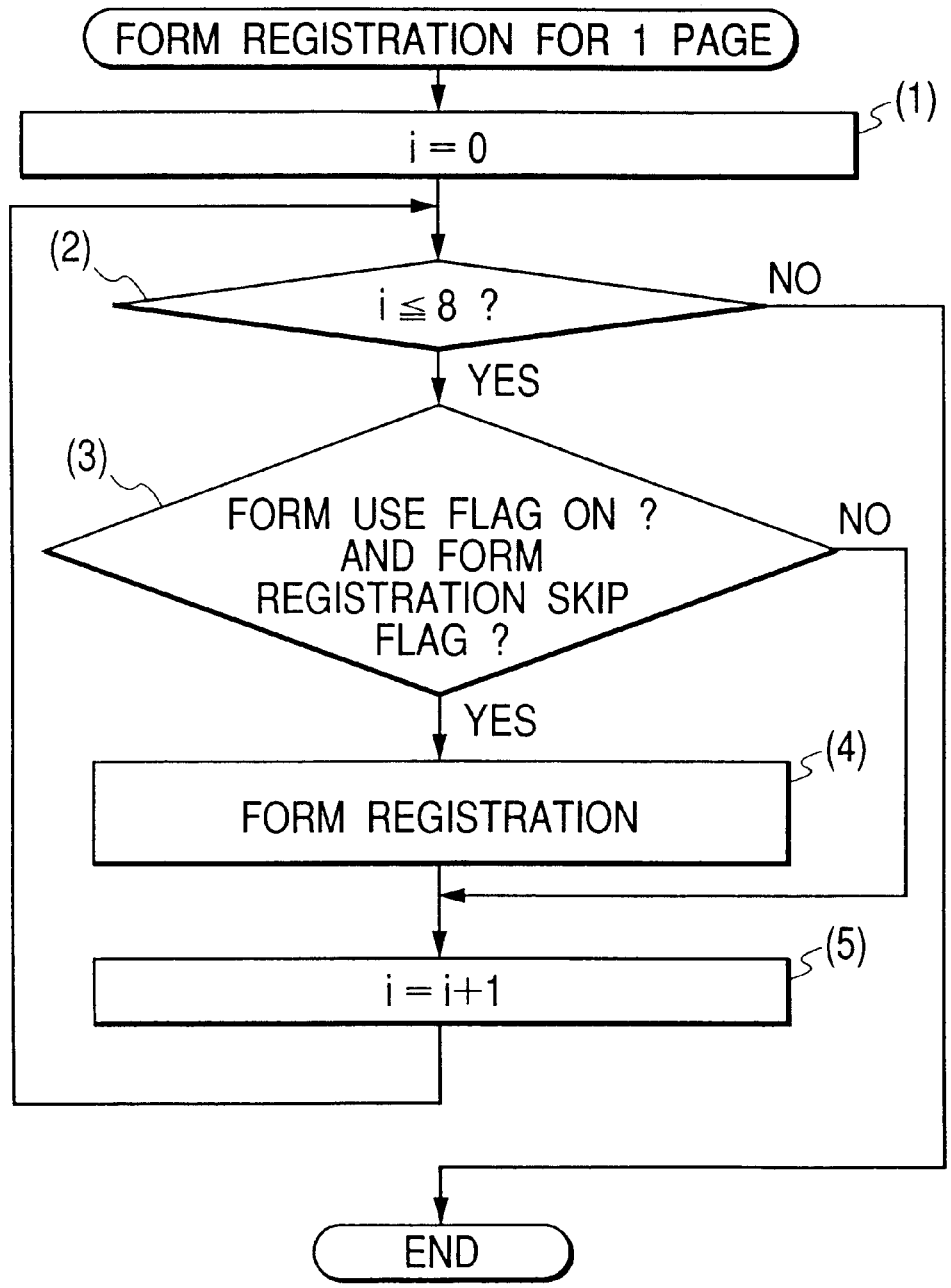
FIG. 8 is a flowchart showing an example of the fourth data processing procedure in the print control apparatus according to the invention.

FIG. 8 is a flowchart showing an example of the fourth data processing procedure in the print control apparatus according to the invention and corresponds to a detailed procedure for the form registering process which is used in one page shown in FIG. 5. Reference numerals (1) to (5) denote processing steps.

First in step (1), the parameter i is initialized. In step (2), whether the parameter i is equal to or less than "8" or not is discriminated. If NO, the processing routine is finished.

If it is determined in step (2) that the parameter is equal to or less than "8", whether the form use flag (all of the forms designated in step (2) shown in FIG. 5) are set to ON) is ON and the form skip flag is OFF or not is discriminated in step (3) with respect to each form which is used in one page designated in step (1) shown in FIG. 5. If NO, step (5) follows and the parameter i is increased by "1". The processing routine is returned to step (2).

In step (3), when it is determined that the form use flag (all of the forms designated in step (2) shown in FIG. 5 have been set to ON) is ON and the form skip flag is OFF with respect to each form which is used in one page designated in step (1) shown in FIG. 5, the form is registered into the printer memory by using the form registration command in step (4). The processing routine advances to step (5). The above processes are repeated until the parameter i is equal to "8". In step (6) shown in FIG. 5, when the form data to be used has already been registered in the printer memory, the form skip flag is turned on. Therefore, the form data registering process in step (4) in FIG. 8 is not performed.

Figure 9:
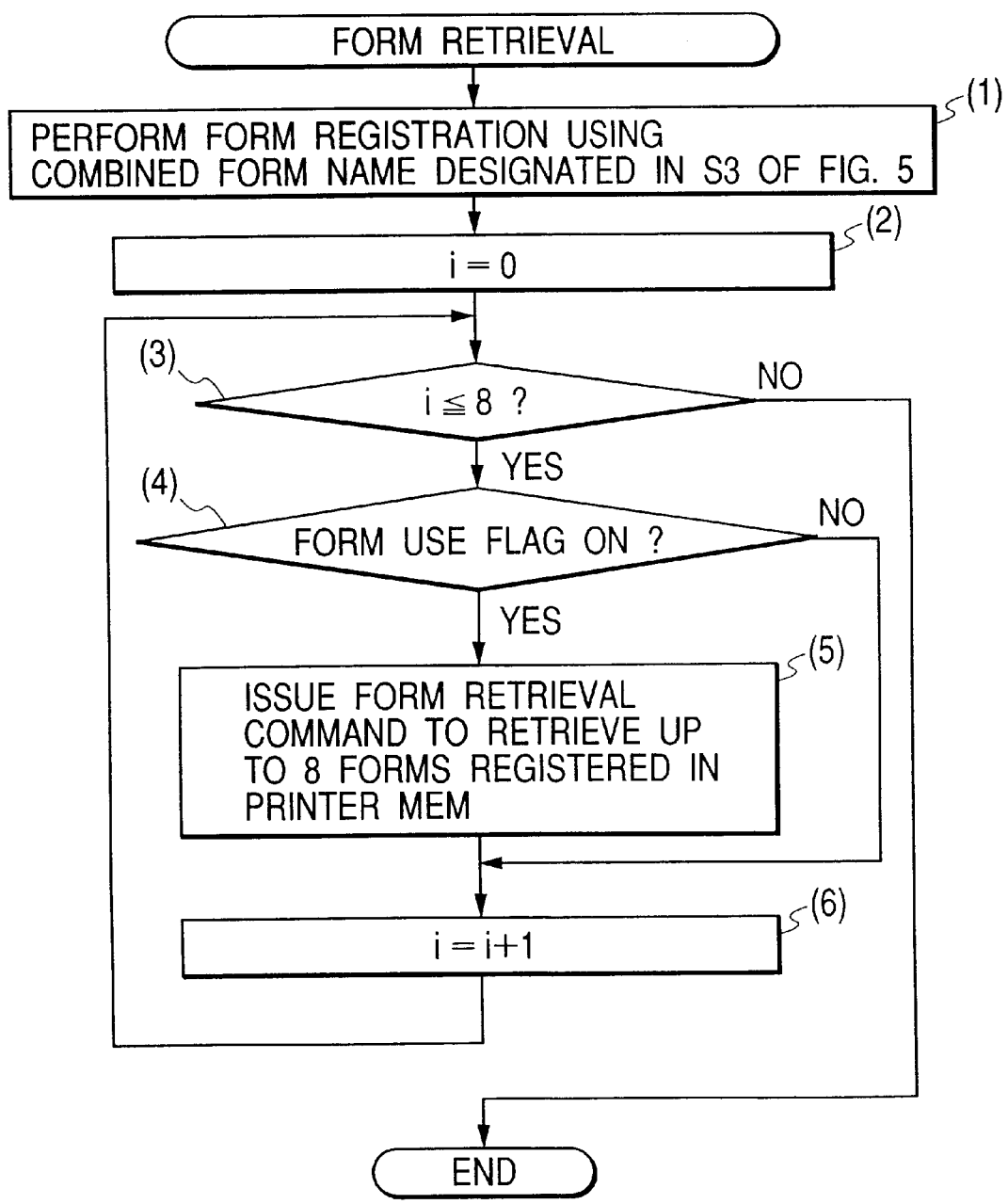
FIG. 9 is a flowchart showing an example of the fifth data processing procedure in the print control apparatus according to the invention.

FIG. 9 is a flowchart showing an example of the fifth data processing procedure in the print control apparatus according to the invention and corresponds to a detailed procedure for the form retrieval process shown in FIG. 5. Reference numerals (1) to (6) denote processing steps.

First in step (1), the form registration is performed by using the combined form name designated in step (3) shown in FIG. 5.

In step (2), the parameter i is initialized. In step (3), whether the parameter i is equal to or less than "8" or not is discriminated. If NO, the processing routine is finished.

When it is determined in step (3) that the parameter i is equal to or less than "8", a check is made in step (4) to see if the form use flag (all of the forms designated in step (2) shown in FIG. 5 have been set to ON) is ON. If NO, step (6) follows. If YES, step (5) follows and the parameter i is increased by "1". The processing routine is returned to step (3).

When it is determined in step (4) that the form use flag has been set to ON, up to eight forms registered in the printer memory are retrieved by the form retrieval command in step (5). The processing routine advances to step (6). As a condition to retrieve the forms, the form to be retrieved is a form in which the form use flag has been set to ON (all of the forms designated in step (2) shown in FIG. 5 are ON).

Thus, by performing the form retrieval like a zigzag pattern in the data that is registered by the combined form name, a plurality of form data can be simultaneously overlaid.

Figure 10:
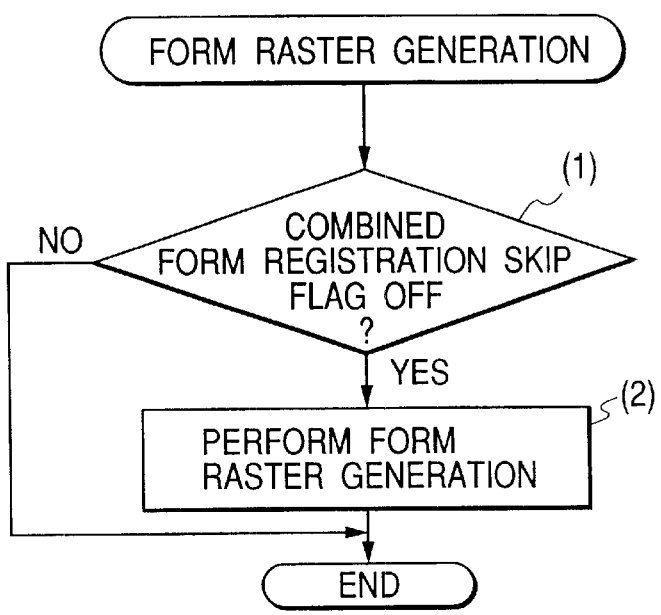
FIG. 10 is a flowchart showing an example of the sixth data processing procedure in the print control apparatus according to the invention.

FIG. 10 is a flowchart showing an example of the sixth data processing procedure in the print control apparatus according to the invention and corresponds to a detailed procedure for the form retrieval process shown in FIG. 5. Reference numerals (1) and (2) denote processing steps.

First in step (1), a check is made to see if the combined form registration skip flag is OFF. If NO, namely, when the combined form registration skip flag is ON, it corresponds to a case where the combined form data of the same name has been registered in the form registration/search process in step (6) shown in FIG. 5. In this case, since a probability that the same form raster has been generated is high, the form raster generating process is skipped and the processing routine is finished.

When it is decided in step (1) that the combined form registration skip flag is OFF, the form raster generation command is executed and the form raster generating process is performed by using the combined form name. The processing routine is finished.

Although the embodiment has been described with respect to the case where the maximum number of form data which can be registered in one page is equal to "8", it is not particularly limited to 8 but a plurality of form data of eight or more can be also registered.

In the comparing process of the form data registered in the printer memory and the form data designated from the application or the like, the embodiment has been described with respect to the case of comparing them by only the form data name. However, for example, it is also possible to perform the comparison by analyzing layout information such as a paper size or the like, actual form data, or the like.

According to the first embodiment, in the case where the same form data is repetitively used by repeating the above process every page, the processes of the form data registration, form raster generation, and the like are skipped and the combined print with the data to be added later using the form raster can be performed at a high speed.

Even in case of a plurality of jobs, if the form raster designated in the printer memory exists, since the form raster on the printer side can be preferentially used, the combined print with the data to be added later can be performed at a high speed. Therefore, the user can perform the print by designating the specific rasterized form name managed by the driver or utility.

Further, commands in the form caching function in the embodiment can be also outputted to a file path designated from the application or the like. Thus, the application or the like can download the outputted file into the flash memory or the like and can automatically generate the form raster upon activation of the power source of the printer.

Second Embodiment

Although the first embodiment has been described with respect to the case where the form data at the time of the form overlay printing process and the print data are unified by either a monochromatic mode or a color mode, it is also possible to construct such that even if the color mode of the form data and the color mode of the print data differ, the form overlay process can be performed. An embodiment in such a case will be described hereinbelow. Constructions and the like of the information processing apparatus and print control apparatus are substantially the same as those in the first embodiment.

The second embodiment will now be described hereinbelow with reference to flowcharts of FIGS. 11 to 13.

Figure 11:
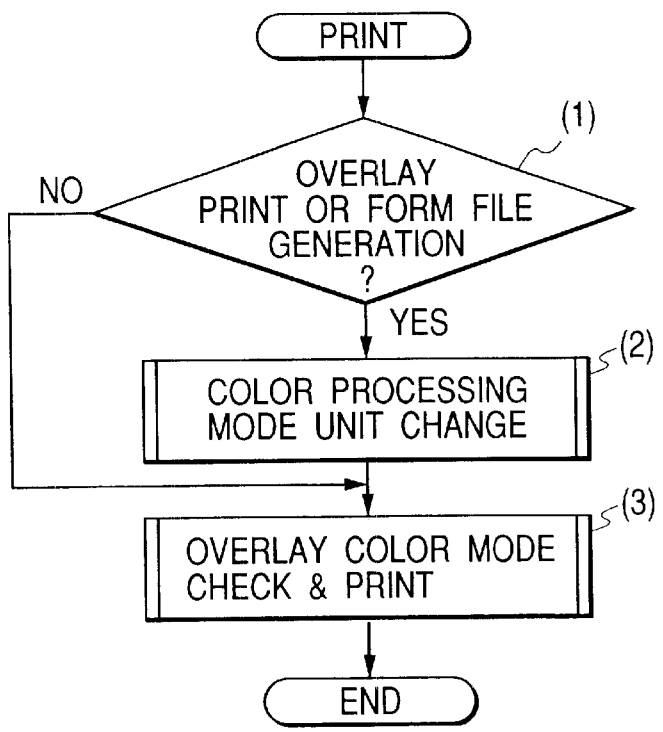
FIG. 11 is a flowchart showing an example of the seventh data processing procedure in the print control apparatus according to the invention.

FIG. 11 is a flowchart showing an example of the seventh data processing procedure in the information processing apparatus and print control apparatus according to the invention and corresponds to an overlay print processing procedure accompanied with a discrimination of the color processing mode. Reference numerals (1) to (3) indicate processing steps. Although FIGS. 11 to 13 will be explained as a control of the information processing apparatus, the processes can be also executed on the print control apparatus side.

First in step (1), the printer driver of the information processing apparatus discriminates whether the setting of the driver set by the user relates to the overlay print or the form file generation. That is, in FIG. 17, a check is made to see if any one of the "normal print", "overlay print", and "form file generation" has been set. When it is determined that the overlay print or the form file generation is not set, step (3) follows and an overlay color mode checking process and a printing process shown in FIG. 13, which will be explained hereinlater, are executed and the processing routine is finished.

When it is decided in step (1) that the overlay print or the form file generation has been set, a color processing mode automatic discriminating process unit changing process is performed in step (2) and the processing routine advances to step (3).

Figure 12:
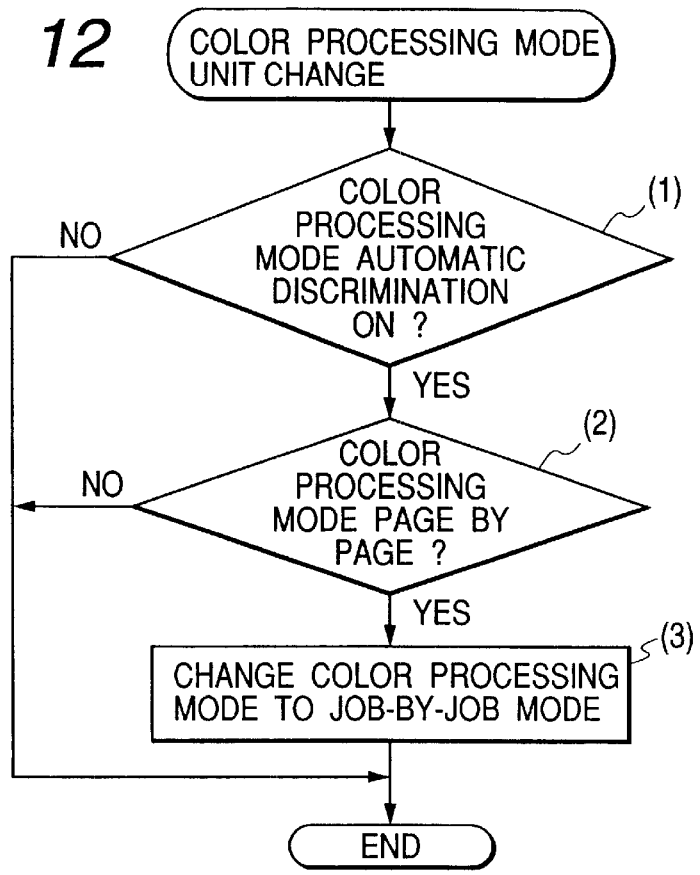
FIG. 12 is a flowchart showing an example of the eighth data processing procedure in the print control apparatus according to the invention.

FIG. 12 is a flowchart showing an example of the eighth data processing procedure in the information processing apparatus and print control apparatus according to the invention and corresponds to a color processing mode automatic discriminating process unit change processing procedure. Reference numerals (1) to (3) indicate processing steps.

Figure 18:
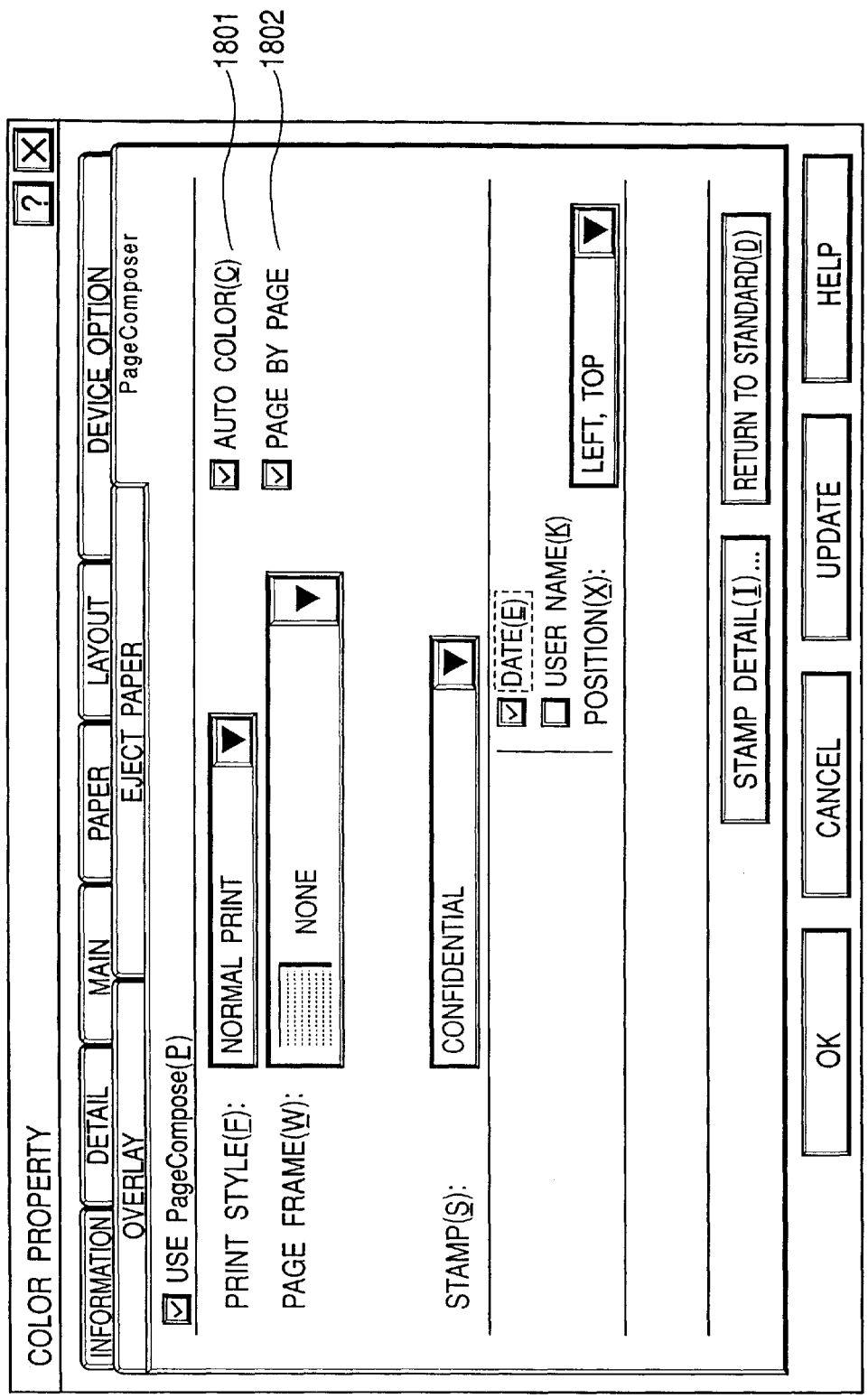
FIG. 18 is a user interface diagram for explaining a picture plane when a color processing mode and its unit are decided by the printer driver in the information processing apparatus of the invention.

First in step (1), the printer driver of the information processing apparatus discriminates whether the color processing mode automatic discriminating process is ON or not. That is, on a picture plane of the setting of the printer driver in FIG. 18, a check is made to see if a check box 1801 has been marked. If YES, the printer driver analyzes the color used in the data in the job, thereby allowing a process for deciding the color processing mode to be performed. When it is determined that the color processing mode automatic discriminating process is OFF, the processing routine is finished.

When it is decided in step (1) that the color processing mode automatic discriminating process unit changing process is ON, a check is made in step (2) to see if the color processing mode is the page-by-page mode. That is, whether a check box 1802 in FIG. 18 has been marked or not is discriminated. If YES, the printer driver analyzes the used color on a page unit basis in the job, thereby allowing the deciding process of the color processing mode to be performed on a page unit basis. If the color processing mode is not the page-by-page mode, namely, when it is decided that the color processing mode is the job-by-job mode, the processing routine is finished.

When it is determined in step (2) that the color processing mode is the page-by-page mode, the color processing mode is changed to the job-by-job mode in step (3) and the processing routine is finished.

Figure 13:
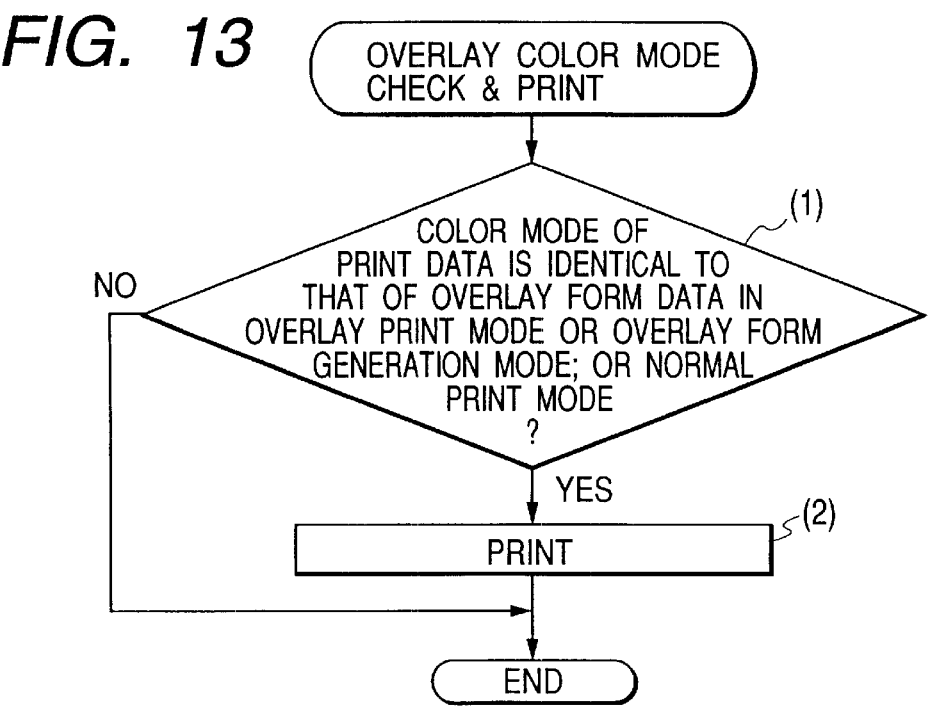
FIG. 13 is a flowchart showing an example of the ninth data processing procedure in the print control apparatus according to the invention.

FIG. 13 is a flowchart showing an example of the ninth data processing procedure in the information processing apparatus and print control apparatus according to the invention and corresponds to an overlay color mode checking process and a print processing procedure. Reference numerals (1) and (2) indicate processing steps.

First in step (1), the printer driver of the information processing apparatus discriminates whether the color modes of the print data and overlay form data in case of the mode (overlay print mode or overlay form generating mode) except for the normal print mode coincide or not or whether the print mode is the normal print mode or not. If YES, the print data is generated and the printing process is executed by the printer 1500 in step (2).

If NO in step (1), namely, in case of the mode (overlay form print mode or overlay form data generating mode) other than the normal print mode, if the color mode of the print data and the color mode of the form data differ, the printing process is stopped and the processing routine is finished. That is, the printer driver of the information processing apparatus interrupts the generating process of the print data and displays "the color modes of the form and document differ" to the user, thereby informing the user of such a fact.

As mentioned above, in step (3) shown in FIG. 12, by performing the color processing mode automatic discriminating process on a job unit basis, the discrimination unit of the color mode of the print data in step (1) in FIG. 13 is set to all of the data in the job as a target and the apparatus operates in the same color mode for all of the data in the job.

Consequently, a situation such that the color mode is switched at the time of the execution of a new-page command in the job as in the color processing mode automatic discriminating process on a page unit basis is eliminated. There is no fear of occurrence of the print stop due to the difference between the color modes of the overlay form data and the print data.

A characteristic construction of the embodiment will now be described hereinbelow.

There is provided a form data processing method with the above construction of a print control apparatus which communicates with a data processing apparatus (host computer 3000) through a predetermined communication medium and can analyze an output job that is received or a storage medium in which a program which can be read out by a computer to control a printing apparatus which communicates with the data processing apparatus through a predetermined communication medium and can analyze an output job that is received has been stored, wherein the form data processing method or the computer readable program comprises: a registering step of registering a plurality of form data which is transferred from the data processing apparatus into a memory (step (4) in FIG. 5); a generating step of analyzing the form data registered in the memory by the registering step and generating a form raster image which is form-overlaid to each page of the output job (step (8) in FIG. 5); a deleting step of deleting the form data registered in the memory by the registering step (step (5) in FIG. 5); a setting step of setting the number of holding pages to be held in the memory every form data when each form data is registered into the memory (step (1) in FIG. 5); a designating step of designating the form data to be used from the form data registered in the memory (step (3) in FIG. 5); and a skipping step of skipping the registration of the same form data which is used in continuous pages into the memory by the registering step and the deletion of the registered same form data from the memory by the deleting step except for the designation of the form data by the designating step until the number of holding pages set by the setting step exceeds the number of print output pages (the jumping step from step (4) to step (7) in FIG. 6 and the jumping step to steps (1) to (3) in FIG. 7 and to step (3) to the end of step in FIG. 7). Therefore, in the case where the pages are continuous in the output job using the same form data as the registered form data, the registering process of the overlapped form data, the rasterizing process based on the registered form data, and the deleting process of the form data are avoided, the raster processing time of each page accompanied with the form overlay can be extremely reduced and the throughput can be improved.

The form data processing method or program has: a discriminating step of discriminating whether the same form data as the form data designated by the designating step has already been registered in the memory or not (step (4) in FIG. 6); and a skip designating step of performing a skip designation to sequentially skip the registration of the same form data which is used in the continuous pages into the memory and the deletion of the registered same form data from the memory except for the designation of the form data by the designating step in the case where it is determined by the discriminating step that the same form data has already been registered in the memory (steps (5) and (6) in FIG. 6), wherein in the skip designating step, since the registration of the same form data which is used in the continuous pages into the memory by the registering step and the deletion of the registered same form data from the memory by the deleting step are skipped on the basis of the skip designating state by the skip designating step, in the case where the pages are continuous in the output job using the same form data as the registered form data, the registering process of the overlapped form data, the rasterizing process based on the registered form data, and the deleting process of the form data can be efficiently avoided.

Further, the form data processing method or program has a form registering step (not shown) of downloading a plurality of form data accumulated in the specific area that is designated in the memory resources at the time of the transfer of the form data from the data processing apparatus upon turn-on of the power source and registering them into the memory. Therefore, the form data in which a probability such that it is used as form data is high is obtained at the time of turn-on of the power source, a situation such that the same form data is transferred is avoided, and a transfer amount of the form data at the time of the output job process can be reduced.

There is provided a form data processing method of a print control apparatus which communicates with a data processing apparatus (host computer 3000) through a predetermined communication medium and can analyze a page job or an output job that is received or a storage medium in which a program which can be read out by a computer to control a printing apparatus which communicates with the data processing apparatus through a predetermined communication medium and can analyze a page job or an output job that is received has been stored, wherein the form data processing method or the computer readable program comprises: a registering step (not shown) of registering color or monochromatic form data which is transferred from the data processing apparatus into a memory; a generating step of analyzing the color or monochromatic form data registered in the memory by the registering step and generating a form raster image which is form-overlaid to each page of the output job (step (2) in FIG. 13); a discriminating step of discriminating whether a color mode in the output job or page job and a color mode of the form data coincide or not before the generation of the raster image by the generating step (step (2) in FIG. 12); a changing step of changing a discrimination unit of the color mode by the discriminating step from a page unit to a job unit (step (3) in FIG. 12); and a limiting step of limiting a form overlay print executing state on the basis of a discrimination result by the discriminating step (step (1) in FIG. 13). Therefore, even when the color mode differs every page, a situation such that the printing process is stopped can be certainly avoided.

A construction of a data processing program which can be read out by a print system to which the print control apparatus according to the invention can be applied will now be described hereinbelow with reference to a memory map shown in FIG. 14.

FIG. 14 is a diagram for explaining a memory map of a storage medium for storing various data processing programs which can be read out by the print system to which the print control apparatus according to the invention can be applied.

Although not particularly shown in the diagram, there is also a case where information to manage programs which are stored in the storage medium, for example, version information, persons who made the programs, and the like are also stored and information depending on the OS or the like on the program reading side, for example, icons or the like to identify and display the programs are also stored.

Further, data depending on various programs is also managed in a directory. There is also a case where a program to install various programs into a computer is stored. If the program to install them was compressed, there is also a case where a program to decompress the compressed program or the like is also stored.

The functions shown in FIGS. 5 to 13 in the embodiments can be also executed by the host computer in accordance with a program that is installed from the outside. In this case, the invention is also applied to a case where information including the programs is supplied to an output apparatus from a storage medium such as CD-ROM, flash memory, FD, or the like or from an external storage medium through a network.

It will be also obviously understood that the objects of the invention are accomplished by a method whereby a storage medium in which program codes of software to realize the functions of the foregoing embodiments have been recorded as mentioned above is supplied to a system or an apparatus and a computer (or CPU or MPU) of the system or apparatus reads out and executes the program codes stored in the storage medium.

In this case, the program codes themselves read out from the storage medium realize the novel functions of the invention and the storage medium in which the program codes have been stored constructs the invention.

As a storage medium to supply the program codes, for example, it is possible to use a floppy disk, a hard disk, an optical disk, a magnetooptic disk, a CD-ROM, a CD-R, a magnetic tape, a non-volatile memory card, an ROM, an EEPROM, or the like.

It will be also obviously understood that the invention also incorporates not only a case where the functions of the foregoing embodiments are realized by executing the program codes read out by the computer but also a case where the OS (operating system) or the like which is operating on the computer executes a part or all of the actual processes on the basis of instructions of the program codes and the functions of the foregoing embodiments are realized by those processes.

Further, the invention also obviously incorporates a case where after the program codes read out from the storage medium were written into a memory provided for a function expanding board inserted in a computer or a function expanding unit connected to the computer, a CPU or the like provided for the function expanding board or the function expanding unit executes a part or all of actual processes on the basis of instructions of the program codes, and the functions of the foregoing embodiments are realized by those processes.

As described above, according to the first aspect of the present invention, there is provided a print control apparatus which communicates with a data processing apparatus through a predetermined communication medium and can analyze an output job that is received, comprising: registering means for registering a plurality of form data which is transferred from the data processing apparatus into a memory; generating means for analyzing the form data registered in the memory by the registering means and generating a form raster image which is form-overlaid to each page of the output job; deleting means for deleting the form data registered in the memory by the registering means; setting means for setting the number of holding pages to be held in the memory every form data when each form data is registered into the memory; designating means for designating the form data which is used from the form data registered in the memory; and control means for skipping the registration of the same form data which is used by continuous pages into the memory by the registering means and the deletion of the registered same form data from the memory by the deleting means except for the designation of the form data by the designating means until the number of holding pages set by the setting means exceeds the number of print output pages. Therefore, in the case where the pages are continuous in the output job using the same form data as the registered form data, the registering process of the overlapped form data, the rasterizing process based on the registered form data, and the deleting process of the form data are avoided, the raster processing time of each page accompanied with the form overlay can be remarkably reduced, and the throughput can be improved.

According to the second aspect of the invention, the print control apparatus comprises: discriminating means for discriminating whether the same form data as the form data that is designated by the designating means has already been registered in the memory or not; and skip designating means for, when it is determined by the discriminating means that the same form data has already been registered in the memory, performing a skip designation to sequentially skip the registration of the same form data that is used in the continuous pages into the memory and the deletion of the registered same form data from the memory except for the designation of the form data by the designating means, wherein the control means skips the registration of the same form data that is used in the continuous pages into the memory by the registering means and the deletion of the registered same form data from the memory by the deleting means on the basis of the skip designating state by the skip designating means. Therefore, in the case where the pages are continuous in the output job using the same form data as the registered form data, the registering process of the overlapped form data, the rasterizing process based on the registered form data, and the deleting process of the form data can be efficiently avoided.

According to the third aspect of the invention, the print control apparatus has registration control means for downloading a plurality of form data accumulated in a specific area that is designated in memory resources at the time of the transfer of the form data from the data processing apparatus when a power source is turned on and for registering them into the memory. Therefore, the form data in which a probability such that it is used as form data is high is obtained at the time of turn-on of the power source, a situation such that the same form data is transferred is avoided, and a transfer amount of the form data at the time of the output job process can be reduced.

According to the fourth aspect of the invention, there is provided a print control apparatus which communicates with a data processing apparatus through a predetermined communication medium and can analyze a page job or an output job that is received, comprising: registering means for registering color or monochromatic form data which is transferred from the data processing apparatus into a memory; generating means for analyzing the color or monochromatic form data registered in the memory by the registering means and generating a form raster image which is form-overlaid to each page of the output job; discriminating means for discriminating whether a color mode in the output job or page job coincides with a color mode of the form data or not before the raster image is generated by the generating means; changing means for changing a discrimination unit about the color mode by the discriminating means from a page unit to a job unit; and control means for controlling a form overlay print executing state on the basis of a discrimination result by the discriminating means. Therefore, even if the color mode differs every page, a situation such that the printing process is stopped can be certainly avoided.

According to the fifth aspect of the invention, there is provided an information processing apparatus which communicates with a print control apparatus through a predetermined communication medium and generates a job to be transmitted, comprising: discriminating means for discriminating whether a form raster image of form data which is used in the job has been held in the print control apparatus or not; and command issue control means for skipping a form execution command to execute a process to raster-generate the form data to the form raster image in the case where the form raster image has been held in the print control apparatus and issuing a form designation command. Therefore, the print data can be generated by the command that can effectively use the form raster image of the print control apparatus and the print throughput is improved.

According to the sixth aspect of the invention, since the information processing apparatus further comprises obtaining means for obtaining information from the print control apparatus, the information can be transmitted and received to/from the print control apparatus and the form cache can be more accurately used.

According to the seventh aspect of the invention, when information showing that the print control apparatus can hold the form raster image is obtained by the obtaining means, the discrimination by the discriminating means is performed. Therefore, the vain discriminating processes decrease and the throughput when the print data is generated is improved.

According to the eighth aspect of the invention, when information showing that the print control apparatus cannot hold the form raster image is obtained by the obtaining means, the command issue control means issues a form execution command to execute a process to raster-generate the form data into the form raster image. Therefore, even when the form cache cannot be used, the form overlay print can be used.

According to the ninth aspect of the invention, when the page in which the form data to be used in the job should be executed is processed, if the form data has been executed in the previous page, the discriminating means determines that the form raster image of the form data has been held in the print control apparatus. Therefore, even in one job, the vain form raster generating process decreases and the print throughput is improved.

According to the tenth aspect of the invention, there is provided an information processing apparatus which communicates with a print control apparatus through a predetermined communication medium and can generate a job to be transmitted, comprising: auto color mode instructing means for discriminating a color used in print data constructing the job on a page unit basis and instructing an auto color mode to allow a color processing mode in the print control apparatus to be decided on a page unit basis; overlay instructing means for instructing a form overlay print; and control means for allowing the auto color mode by the auto color mode instructing means to be determined as a color processing mode on a job unit basis in the case where the form overlay print is instructed by the overlay instructing means. Therefore, even when using the auto color mode, a situation such that the print becomes impossible because the color processing mode differs every page is eliminated.

According to the eleventh and twelfth aspect of the invention, the information processing apparatus further comprises: generating means for generating the print data in accordance with a print request; discriminating means for discriminating whether a color mode of the print data coincides with a color mode of the form data or not in the case where the form overlay print is instructed by the overlay instructing means and the print data is generated by the generating means; and control means for controlling whether the generating process of the print data by the generating means is continued or interrupted on the basis of a discrimination result by the discriminating means. Therefore, when the color processing mode does not coincide, since such a fact can be discriminated at the first of the job, the vain print output can be eliminated.

Consequently, there are advantages such that the overlapped vain data processes at the time of the form overlay printing process using the same form data that is derived from the data processing apparatus are eliminated, the efficiency of the form overlay printing process between the output job which is inputted and the form data is raised, the throughput can be remarkably improved, and the like.

What is claimed is:

1. A print control apparatus which communicates with a data processing apparatus through a predetermined communication medium and can analyze an output job that is received, the print control apparatus comprising:

registering means for registering form data for a plurality of forms which are transferred from the data processing apparatus into a memory;

generating means for analyzing the form data registered in the memory by said registering means and generating a form raster image which is form-overlaid to each page of the output job;

deleting means for deleting the form data registered in the memory by said registering means;

setting means for setting a number of holding pages to be held in the memory for each form when the form data for each form is registered into the memory;

designating means for designating the form data which is used from the form data registered in the memory; and control means for skipping the registration of the same form data which is used by continuous pages into the memory by said registering means and the deletion of the registered same form data from the memory by said deleting means except for the designation of the form data by said designating means until the number of holding pages set by said setting means exceeds a number of print output pages.

2. A print control apparatus according to claim 1, further comprising:

discriminating means for discriminating whether the same form data as the form data that is designated by said designating means has already been registered in the memory; and skip designating means for, when it is determined by said discriminating means that the same form data has already been registered in the memory, performing a skip designation to sequentially skip the registration of the same form data that is used in the continuous pages into the memory and the deletion of the registered same form data from the memory except for the designation of the form data by said designating means, wherein said control means skips the registration of the same form data that is used in the continuous pages into the memory by said registering means and the deletion of the registered same form data from the memory by said deleting means on the basis of the skip designating state by said skip designating means.

3. A print control apparatus according to claim 1, further comprising registration control means for downloading form data for a plurality of forms accumulated in a specific area that is designated in memory resources at the time of the transfer of the form data from the data processing apparatus when a power source is turned on and for registering the downloaded form data into the memory.

4. A print control apparatus which communicates with a data processing apparatus through a predetermined communication medium and can analyze a page job or an output job that is received, the print control apparatus comprising:

registering means for registering color or monochromatic form data which is transferred from the data processing apparatus into a memory;

generating means for analyzing the color or monochromatic form data registered in the memory by said registering means and generating a form raster image which is form-overlaid to each page of the output job;

discriminating means for discriminating whether a color mode in the output job or page job coincides with a color mode of the form data before the raster image is generated by said generating means;

changing means for changing a discrimination unit about the color mode by said discriminating means from a page unit to a job unit; and control means for controlling a form overlay print executing state on the basis of a discrimination result by said discriminating means.

5. A form data processing method of a print control apparatus which communicates with a data processing apparatus through a predetermined communication medium and can analyze an output job received, the form data processing method comprising the steps of:

registering form data for a plurality of forms which are transferred from the data processing apparatus into a memory;

analyzing the form data registered in the memory in said registering step and generating a form raster image which is form-overlaid to each page of the output job;

deleting the form data registered in the memory in said registering step;

setting a number of holding pages to be held in the memory for each form when the form data for each form is registered into the memory;

designating the form data which is used from the form data registered in the memory; and skipping the registration of the same form data which is used by continuous pages into the memory in said registering step and the deletion of the registered same form data from the memory in said deleting step except for the designation of the form data in said designating step until the number of holding pages set in said setting step exceeds a number of print output pages.

6. A form data processing method according to claim 5, further comprising the steps of:

discriminating whether the same form data as the form data designated in said designating step has already been registered in the memory; and when it is discriminated in said discriminating step that the same form data has already been registered in the memory, performing a skip designation to sequentially skip the registration of the same form data that is used in continuous pages into the memory and the deletion of the registered same form data from the memory except for the designation of the form data in said designating step, wherein in said skip designating step, the registration of the same form data that is used in the continuous pages into the memory in said registering step and the deletion of the registered same form data from the memory in said deleting step are skipped on the basis of the skip designating state in said skip designating step.

7. A form data processing method according to claim 5, further comprising a form registering step of downloading form data for a plurality of forms accumulated in a specific area that is designated in memory resources at the time of the transfer of the form data from the data processing apparatus when a power source is turned on and registering the downloaded from data into the memory.

8. A form data processing method of a print control apparatus which communicates with a data processing apparatus through a predetermined communication medium and can analyze a page job or an output job received, the form data processing method comprising the steps of:

registering color or monochromatic form data transferred from the data processing apparatus into a memory;

analyzing the color or monochromatic form data registered in the memory in said registering step and generating a form raster image which is form-overlaid to each page of the output job;

discriminating whether a color mode in the output job or page job coincides with a color mode of the form data before the raster image is generated in said generating step;

changing a discrimination unit about the color mode in said discriminating step from a page unit to a job unit; and limiting a form overlay print executing state on the basis of a discrimination result in said discriminating step.

9. A computer-readable storage medium for storing a program for controlling a printing apparatus which communicates with a data processing apparatus through a predetermined communication medium and can analyze an output job received, the program comprising the steps of:

registering form data for a plurality of forms which are transferred from the data processing apparatus into a memory;

analyzing the form data registered in the memory in said registering step and generating a form raster image which is form-overlaid to each page of the output job;

deleting the form data registered in the memory in said registering step;

setting a number of holding pages to be held in the memory for each form when the form data for each form is registered into the memory;

designating the form data which is used from the form data registered in the memory; and skipping the registration of the same form data which is used by continuous pages into the memory in said registering step and the deletion of the registered same form data from the memory in said deleting step except for the designation of the form data in said designating step until the number of holding pages set in said setting step exceeds a number of print output pages.

10. A computer-readable storage medium according to claim 9, wherein the program further comprises the steps of;

discriminating whether the sane form data as the form data designated in said designating step has already been registered in the memory; and when it is discriminated in said discriminating step that the same form data has already been registered in the memory, performing a skip designation to sequentially skip the registration of the same form data that is used in the continuous pages into the memory and the deletion of the registered same form data from the memory except for the designation of the form data in said designating step, wherein in said skip designating step, the registration of the same form data that is used in the continuous pages into the memory in said registering step and the deletion of the registered same form data from the memory in said deleting step are skipped on the basis of the skip designating state in said skip designating step.

11. A computer-readable storage medium according to claim 9, wherein said program further comprises a form registering step of downloading form data for a plurality of forms accumulated in a specific area designated in memory resources at the time of the transfer of the form data from the data processing apparatus when a power source is turned on and registering the downloaded form data into the memory.

12. A computer-readable storage medium for storing a program for controlling a printing apparatus which communicates with a data processing apparatus through a predetermined communication medium and can analyze a page job or an output job received, the program comprising the steps of:

registering color or monochromatic form data transferred from the data processing apparatus into a memory;

analyzing the color or monochromatic form data registered in the memory in said registering step and generating a form raster image which is form-overlaid to each page of the output job;

discriminating whether a color mode in the output job or page job coincides with a color mode of the form data before the raster image is generated in said generating step;

changing a discrimination unit about the color mode in said discriminating step from a page unit to a job unit; and limiting a form overlay print executing state on the basis of a discrimination result in said discriminating step.

13. An information processing apparatus which communicates with a print control apparatus through a predetermined communication medium and generates a job to be transmitted, the information processing apparatus comprising:

discriminating means for discriminating whether a form raster image of form data which is used in the job has been held in the print control apparatus or not; and command issue control means for skipping a form execution command to execute a process to raster-generate the form data to the form raster image in the case where the form raster image has been held in the print control apparatus and issuing a form designation command.

14. An information processing apparatus according to claim 13, further comprising obtaining means for obtaining information from the print control apparatus.

15. An information processing apparatus according to claim 14, wherein when information showing that the print control apparatus can hold the form raster image is obtained by said obtaining means, the discrimination by said discriminating means is performed.

16. An information processing apparatus according to claim 14, wherein when information showing that the print control apparatus cannot hold the form raster image is obtained by said obtaining means, said command issue control means issues a form execution command to execute a process to raster-generate the form data into the form raster image.

17. An information processing apparatus according to claim 15, wherein when a page in which the form data to be used in the job should be executed is processed, if the form data has been executed in a previous page, said discriminating means determines that the form raster image of the form data has been held in the print control apparatus.

18. An information processing apparatus which communicates with a print control apparatus through a predetermined communication medium and can generate a job to be transmitted, the information processing apparatus comprising:

auto color mode instructing means for discriminating a color used in print data constructing the job on a page unit basis and instructing an auto color mode to allow a color processing mode in the print control apparatus to be decided on a page unit basis;

overlay instructing means for instructing a form overlay print; and control means for allowing the auto color mode instructed by said auto color mode instructing means to be determined as a color processing mode on a job unit basis in the case where the form overlay print is instructed by said overlay instructing means.

19. An information processing apparatus according to claim 18, further comprising generating means for generating the print data in accordance with a print request.

20. An information processing apparatus according to claim 19, further comprising:

discriminating means for discriminating whether a color mode of the print data coincides with a color mode of the form data in the case where the form overlay print is instructed by said overlay instructing means and the print data is generated by said generating means; and control means for controlling whether the process of generating the print data by said generating means is continued or interrupted on the basis of a discrimination result by said discriminating means.

21. A control method of an information processing apparatus which communicates with a print control apparatus through a predetermined communication medium and generates a job to be transmitted, the control method comprising the steps of:

discriminating whether a form raster image of form data which is used in the job has been held in the print control apparatus; and skipping a form execution command to execute a process to raster-generate the form data to the form raster image in the case where the form raster image has been held in the print control apparatus and issuing a form designation command.

22. A method according to claim 21, further comprising an obtaining step of obtaining information from the print control apparatus.

23. A method according to claim 22, wherein when information showing that the print control apparatus can hold the form raster image is obtained in said obtaining step, the discrimination in said discriminating step is performed.

24. A method according to claim 22, wherein when information showing that the print control apparatus cannot hold the form raster image is obtained in said obtaining step, in said command issue control stop, a form execution command to execute a process to raster-generate the form data into the form raster image is issued.

25. A method according to claim 23, wherein in said discriminating step, when the page in which the form data to be used in the job should be executed is processed, if the form data has been executed in the previous page, it is determined that the form raster image of the form data has been held in the print control apparatus.

26. A control method of an information processing apparatus which communicates with a print control apparatus through a predetermined communication medium and can generate a job to be transmitted, the control method comprising the steps of:

discriminating a color used in print data constructing the job on a page unit basis and instructing an auto color mode to allow a color processing mode in the print control apparatus to be decided on a page unit basis;

instructing a form overlay print; and allowing the auto color mode instructed in said auto color mode instructing step to be determined as a color processing mode on a job unit basis in the case where the form overlay print is instructed in said overlay instructing step.

27. A control method according to claim 26, further comprising a generating step of generating the print data in accordance with a print request.

28. A control method according to claim 27, further comprising the steps of:

discriminating whether a color mode of the print data coincides with a color mode of the form data in the case where the form overlay print is instructed in said overlay instructing step and the print data is generated in said generating step; and controlling whether the process of generating the print data in said generating step is continued or interrupted on the basis of a discrimination result in said discriminating step.

29. A computer-readable storage medium for storing a program for controlling an information processing apparatus which communicates with a print control apparatus through a predetermined communication medium and generates a job to be transmitted, said program comprising the steps of:

discriminating whether a form raster image of form data which is used in the job has been held in the print control apparatus; and skipping a form execution command to execute a process to raster-generate the form data to the form raster image in the case where the form raster image has been held in the print control apparatus and issuing a form designation command.

30. A medium according to claim 29, wherein said program further comprises an obtaining step of obtaining information from the print control apparatus.

31. A medium according to claim 30, wherein when information showing that the print control apparatus can hold the form raster image is obtained in said obtaining step, the discrimination in said discriminating step is performed.

32. A medium according to claim 30, wherein when information showing that the print control apparatus cannot hold the form raster image is obtained in said obtaining step, in said command issue control step, a form execution command to execute a process to raster-generate the form data into the form raster image is issued.

33. A medium according to claim 31, wherein in said discriminating step, when the page in which the form data to be used in the job should be executed is processed, if the form data has been executed in the previous page, it is determined that the form raster image of the form data has been held in the print control apparatus.

34. A computer-readable storage medium for storing a program for controlling an information processing apparatus which communicates with a print control apparatus through a predetermined communication medium and can generate a job to be transmitted, said program comprising the steps of:

discriminating a color used in print data constructing the job on a page unit basis and instructing an auto color mode to allow a color processing mode in the print control apparatus to be decided on a page unit basis;

instructing a form overlay print; and allowing the auto color mode instructed in said auto color mode instructing step to be determined as a color processing mode on a job unit basis in the case where the form overlay print is instructed in said overlay instructing step.

35. A computer-readable storage medium according to claim 34, wherein said program further comprises a generating step of generating the print data in accordance with a print request.

36. A computer-readable storage medium according to claim 35, wherein said program further comprises the steps of:

discriminating whether a color mode of the print data coincides with a color mode of the form data or not in the case where the form overlay print is instructed in said overlay instructing step and the print data is generated in said generating step; and controlling whether the process of generating the print data in said generating step is continued or interrupted on the basis of a discrimination result in said discriminating step.

37. A print control apparatus which communicates with a data processing apparatus through a predetermined communication medium and can analyze an output job that is received, the print control apparatus comprising:

a program memory for storing process steps executable to register form data for a plurality of forms which are transferred from the data processing apparatus into a memory, analyze the form data registered in the memory and generate a form raster image which is form-overlaid to each page of the output job, delete the form data registered in the memory, set a number of holding pages to be held in the memory for each form when the form data for each form is registered into the memory, designate the form data which is used from the form data registered in the memory, and skip the registration of the same form data which is used by continuous pages into the memory and the deletion of the registered same form data from the memory except for the designation of the form data until the number of holding pages set exceeds a number of print output pages; and a processor for executing the process steps stored in said program memory.

38. A print control apparatus which communicates with a data processing apparatus through a predetermined communication medium and can analyze a page job or an output job that is received, the print control apparatus comprising:

a program memory for storing process steps executable to register color or monochromatic form data which is transferred from the data processing apparatus into a memory, analyze the color or monochromatic form data registered in the memory and generate a form raster image which is form-overlaid to each page of the output job or page job, discriminate whether a color mode in the output job or page job coincides with a color mode of the form data before the raster image is generated, change a discrimination unit about the color mode from a page unit to a job unit, and control a form overlay print executing state on the basis of the discrimination result; and a processor for executing, the process steps stored in said program memory.

39. An information processing apparatus which communicates with a print control apparatus through a predetermined communication medium and generates a job to be transmitted, the information processing apparatus comprising;

a program memory for storing process steps executable to discriminate whether a form raster image of form data which is used in the job has been held in the print control apparatus or not, and skip a form execution command to execute a process to raster-generate the form data to the form raster image in the case where the form raster image has been held in the print control apparatus and issuing a form designation command; and a processor for executing the process steps stored in said program memory.

40. An information processing apparatus which communicates with a print control apparatus through a predetermined communication medium and can generate a job to be transmitted, the information processing apparatus comprising:

a program memory for storing process steps executable to discriminate a color used in print data constructing the job on a page unit basis and instruct an auto color mode to allow a color processing mode in the print control apparatus to be decided on a page unit basis, instruct a form overlay print, and allow the instructed auto color mode to be determined as a color processing mode on a job unit basis in the case where the form overlay print is instructed; and a processor for executing the process steps stored in said program memory.

41. Computer-executable program code stored on a computer-readable storage medium, the computer-executable program code for controlling a printing apparatus which communicates with a data processing apparatus through a predetermined communication medium and can analyze an output job received, the computer-executable program code comprising:

code to register form data for a plurality of forms which are transferred from the data processing apparatus into a memory;

code to analyze the form data registered in the memory and generate a form raster image which is form-overlaid to each page of the output job;

code to delete the form data registered in the memory;

code to set a number of holding pages to be held in the memory for each form when the form data for each form is registered into the memory;

code to designate the form data which is used from the form data registered in the memory; and code to skip the registration of the same form data which is used by continuous pages into the memory and the deletion of the registered same form data from the memory except for the designation of the form data until the number of holding pages set exceeds a number of print output pages.

42. Computer-executable program code stored on a computer-readable storage medium, the computer-executable program code for controlling a printing apparatus which communicates with a data processing apparatus through a predetermined communication medium and can analyze a page job or an output job received, the computer-executable program code comprising:

code to register color or monochromatic form data which is transferred from the data processing apparatus into a memory;

code to analyze the color or monochromatic form data registered in the memory and generate a form raster image which is form-overlaid to each page of the output job;

code to discriminate whether a color mode in the output job or page job coincides with a color mode of the form data before the raster image is generated;

code to change a discrimination unit about the color mode of said code to discriminate from a page unit to a job unit; and code to limit a form overlay print executing state on the basis of a discrimination result of said code to discriminate.

43. Computer-executable program code stored on a computer-readable storage medium, the computer-executable program code for controlling an information processing apparatus which communicates with a print control apparatus through a predetermined communication medium and generates a job to be transmitted, the computer-executable program comprising:

code to discriminate whether a form raster image of form data which is used in the job has been held in the print control apparatus; and code to skip a form execution command to execute a process to raster-generate the form data to the form raster image in the case where the form raster image has been held in the print control apparatus and to issue a form designation command.

44. Computer-executable program code stored on a computer-readable storage medium, the computer-executable program code for controlling an information processing apparatus which communicates with a print control apparatus through a predetermined communication medium and can generate a job to be transmitted, the computer-executable program code comprising:

code to discriminate a color used in print data constructing the job on a page unit basis and to instruct an auto color mode to allow a color processing mode in the print control apparatus to be decided on a page unit basis;

code to instruct a form overlay print; and code to allow the instructed auto color mode to be determined as a color processing mode on a job unit basis in the case where the form overlay print is instructed.

45. An information processing apparatus which communicates with a print control apparatus through a predetermined communication medium and generates a print job to be transmitted, the information processing apparatus comprising:

discriminating means for discriminating which one of a first type of form data and a second type of form data is to be used, wherein a form raster image is held for the first type of form data in the print control apparatus and no form raster image is held for the second type of form data in the print control apparatus; and print data generating means for generating print data constituting a print job, wherein said print data generating means generates the print data including a form designation command and data to be overlaid if said discriminating means discriminates that the first type of form data is to be used, and wherein said print data generating means generates the print data including a form execution command for generating a form into a form raster image, a form designation command and data to be overlaid if said discriminating means discriminates that the second type of form data is to be used.

46. An information processing apparatus according to claim 45, further comprising user interface control means for controlling a display unit to display a user interface window of a printer driver for designating form data, wherein said discriminating means makes a discrimination based on the form data designated through the user interface window.

47. An information processing apparatus according to claim 46, further comprising obtaining means for obtaining information indicative of the first type of form data from the print control apparatus, wherein said user interface control means controls the display unit to display the first type of form data in the user interface window of the printer driver based on the information obtained by said obtaining means.

48. An information processing apparatus according to claim 45, wherein said print data generating means generates the print data by skipping a process of making the form execution command if said discriminating means discriminates that the first type of form data is to be used.

49. An information processing apparatus according to claim 45, wherein when a page in which form data to be used in a print job should be executed is processed, if the form data has been executed in a previous page, said discriminating means discriminates that the form data is of the first type.

50. A control method of an information processing apparatus for communicating with a print control apparatus through a predetermined communication medium and generating a print job to be transmitted, the control method comprising the steps of:

discriminating which one of a first type of form data and a second type of form data is to be used, wherein a form raster image is held for the first type of form data in the print control apparatus and no form raster image is held for the second type of form data in the print control apparatus; and generating print data constituting a print job, wherein the print data generated in said generating step includes a form designation command and data to be overlaid if it is discriminated in said discriminating step that the first type of form data is to be used, and wherein the print data generated in said generating step includes a form execution command for generating a form into a form raster image, a form designation command, and data to be overlaid if it is discriminated in said discriminating step that the second type of form data is to be used.

51. A control method according to claim 50, further comprising the step of controlling a display unit to display a user interface window of a printer driver for designating form data, wherein the discrimination made in said discriminating step is based on the form data designated through the user interface window.

52. A control method according to claim 51, further comprising the step of obtaining information indicative of the first type of form data from the print control apparatus, wherein the display unit is controlled in said controlling step to display the first type of form data in the user interface window of the printer driver based on the information obtained in said obtaining step.

53. A control method according to claim 50, wherein the print data is generated in said generating step by skipping a process of making the form execution command if it is discriminated in said discriminating step that the first type of form data is to be used.

54. A control method according to claim 50, wherein when a page in which form data to be used in a print job should be executed is processed, if the form data has been executed in a previous page, it is discriminated in said discriminating step that the form data is of the first type.

55. Computer-executable program code stored on a computer-readable storage medium, the computer-executable program code for controlling an information processing apparatus which communicates with a print control apparatus through a predetermined communication medium and generating a print job to be transmitted, the computer-executable program code comprising:

code to discriminate which one of a first type of form data and a second type of form data is to be used, wherein a form raster image is held for the first type of form data in the print control apparatus and no form raster image is held for the second type of form data in the print control apparatus; and code to generate print data constituting a print job, wherein the print data generated by said code to generate includes a form designation command and data to be overlaid if said code to discriminate discriminates that the first type of form data is to be used, and wherein the print data generated by said code to generate includes a form execution command for generating a form into a form raster image, a form designation command, and data to be overlaid if said code to discriminate discriminates that the second type of form data is to be used.

56. Computer-executable program code according to claim 55, further comprising code to control a display unit to display a user interface window of a printer driver for designating form data, wherein the discrimination made by said code to discriminate is based on the form data designated through the user interface window.

57. Computer-executable program code according to claim 56, further comprising code to obtain information indicative of the first type of form data from the print control apparatus, wherein the display unit is controlled by said code to control to display the first type of form data in the user interface window of the printer driver based on the information obtained by said code to obtain.

58. Computer-executable program code according to claim 55, wherein the print data is generated by said code to generate by skipping a process of making the form execution command if it is discriminated by said code to discriminate that the first type of form data is to be used.

59. Computer-executable program code according to claim 55, wherein when a page in which form data to be used in a print job should be executed is processed, if the form data has been executed in a previous page, it is discriminated by said code to discriminate that the form data is of the first type.

60. An information processing apparatus which communicates with a print control apparatus through a predetermined communication medium and generates a print job to be transmitted, the information processing apparatus comprising:

a program memory for storing process steps executable to discriminate which one of a first type of form data and a second type of form data is to be used, wherein a form raster image is held for the first type of form data in the print control apparatus and no form raster image is held for the second type of form data in the print control apparatus, and generate print data constituting a print job, wherein the generated print data includes a form designation command and data to be overlaid if it is discriminated that the first type of form data is to be used, and wherein the generated print data includes a form execution command for generating a form into a form raster image, a form designation command, and data to be overlaid if it is discriminated that the second type of form data is to be used; and a processor for executing the process steps stored in said program memory.

* * * * *

UNITED STATES PATENT AND TRADEMARK OFFICE
CERTIFICATE OF CORRECTION

PATENT NO. : 6,501,561 B2
DATED : December 31, 2002
INVENTOR(S) : Eiji Hayashi

It is certified that error appears in the above-identified patent and that said Letters Patent is hereby corrected as shown below:

Column 15,
Line 62, "FIG. 5)" should read -- FIG. 5 --.

Column 26,
Line 11, "from" should read -- form --; and
Line 58, "of;" should read -- of: --.

Column 28,
Line 61, "stop," should read -- step, --.

Column 31,
Line 10, "ing;" should read -- ing: --.

Signed and Sealed this

Fifteenth Day of July, 2003

JAMES E. ROGAN
*Director of the United States Patent and Trademark Office*